United States Patent
Wada et al.

(10) Patent No.: US 10,302,046 B2
(45) Date of Patent: May 28, 2019

(54) OZONE GENERATOR AND INTERNAL COMBUSTION ENGINE WITH OZONE GENERATOR

(71) Applicant: Mitsubishi Electric Corporation, Chiyoda-ku (JP)

(72) Inventors: Noboru Wada, Chiyoda-ku (JP); Takahiro Inoue, Chiyoda-ku (JP); Taichiro Tamida, Chiyoda-ku (JP); Yasutaka Inanaga, Chiyoda-ku (JP); Takashi Hashimoto, Chiyoda-ku (JP); Koji Wada, Chiyoda-ku (JP); Tetsuya Honda, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/765,747

(22) PCT Filed: Aug. 31, 2016

(86) PCT No.: PCT/JP2016/075458
§ 371 (c)(1),
(2) Date: Apr. 4, 2018

(87) PCT Pub. No.: WO2017/094303
PCT Pub. Date: Jun. 8, 2017

(65) Prior Publication Data
US 2018/0283323 A1    Oct. 4, 2018

(30) Foreign Application Priority Data

Dec. 4, 2015  (JP) .................................. 2015-237138

(51) Int. Cl.
*F02M 25/12* (2006.01)
*C01B 13/11* (2006.01)
(Continued)

(52) U.S. Cl.
CPC ............. *F02M 25/12* (2013.01); *C01B 13/11* (2013.01); *C01B 13/115* (2013.01); *F02B 51/04* (2013.01);
(Continued)

(58) Field of Classification Search
CPC ............................... F02M 25/12; F02M 27/04
See application file for complete search history.

(56) References Cited

U.S. PATENT DOCUMENTS

2001/0042370 A1* 11/2001 Ohta ....................... C01B 13/11
60/275
2005/0126550 A1*  6/2005 Varasundharosoth ......................
F02M 25/0836
123/539

(Continued)

FOREIGN PATENT DOCUMENTS

CN           102562406 A    7/2012
DE   20 2009 005 307 U1    9/2009
(Continued)

OTHER PUBLICATIONS

Office Action dated Feb. 7, 2017 in Japanese application No. 2016-575995 (with English translation).
(Continued)

*Primary Examiner* — Long T Tran
(74) *Attorney, Agent, or Firm* — Oblon, McClelland, Maier & Neustadt, L.L.P.

(57) ABSTRACT

An ozone generator and an internal combustion engine with the ozone generator that can raise ozone additive rate of whole intake air, while suppressing pressure loss in the intake pipe from increasing. The internal combustion engine with an ozone generator includes a tubular intake pipe, through an inner region of which air flows, an ozone generator having an electrode plate that makes ozone and is disposed in the inner region or in the intake pipe, and a
(Continued)

limiter that limits the flow of air in the inner region of the intake pipe; the electrode plate has a planar dielectric and high-voltage-side and low-voltage-side electrodes adhered and fixed to the dielectric and is formed in a shape of a plate extending in a direction in which air flows.

17 Claims, 20 Drawing Sheets

(51) Int. Cl.
  F02B 51/04    (2006.01)
  F02M 25/00    (2006.01)
  F02M 27/04    (2006.01)
  F02D 9/02     (2006.01)
  F02M 26/05    (2016.01)

(52) U.S. Cl.
  CPC .............. *F02D 9/02* (2013.01); *F02M 25/00* (2013.01); *F02M 27/04* (2013.01); *C01B 2201/12* (2013.01); *C01B 2201/22* (2013.01); *C01B 2201/32* (2013.01); *C01B 2201/62* (2013.01); *C01B 2201/70* (2013.01); *F02D 2009/0283* (2013.01); *F02M 26/05* (2016.02); *Y02T 10/121* (2013.01); *Y02T 10/126* (2013.01)

(56) References Cited

U.S. PATENT DOCUMENTS

| | | | | |
|---|---|---|---|---|
| 2009/0120415 A1* | 5/2009 | Clack | ................... | F02M 27/02 123/537 |
| 2011/0030625 A1* | 2/2011 | Hammer | ................ | F02M 25/12 123/3 |
| 2011/0056445 A1* | 3/2011 | Plata | ...................... | C01B 13/11 123/3 |
| 2011/0214647 A1* | 9/2011 | Clack | .................... | F02M 25/12 123/537 |
| 2011/0247596 A1* | 10/2011 | Clack | .................... | F02M 27/02 123/539 |
| 2012/0318245 A1* | 12/2012 | Clack | .................... | F02M 27/02 123/537 |
| 2013/0112157 A1* | 5/2013 | Brown | ................... | F02M 25/12 123/3 |
| 2015/0240758 A1* | 8/2015 | Fujimoto | .............. | F02D 41/402 123/3 |
| 2015/0369102 A1* | 12/2015 | Kinugawa | .............. | F01N 3/0814 60/295 |
| 2016/0084130 A1* | 3/2016 | Yahata | ................. | F01N 3/0814 422/111 |

FOREIGN PATENT DOCUMENTS

| | | |
|---|---|---|
| FR | 1 157 266 A | 5/1958 |
| JP | S52-085093 A | 7/1977 |
| JP | S57-059051 A | 4/1982 |
| JP | 08-217413 A | 8/1996 |
| JP | 10-203805 A | 8/1998 |
| JP | 2000-018107 A | 1/2000 |
| JP | 2001-295706 A | 10/2001 |
| JP | 2007-107491 | 4/2007 |
| JP | 2013-194712 A | 9/2013 |

OTHER PUBLICATIONS

International Search Report dated Nov. 1, 2016 in PCT/JP2016/075458, filed on Aug. 31, 2016.

Office Action dated Nov. 13, 2018 in Patent Application No. 11 2016 005 519.6, with English translation citing documents AO, AP and AQ therein.

* cited by examiner

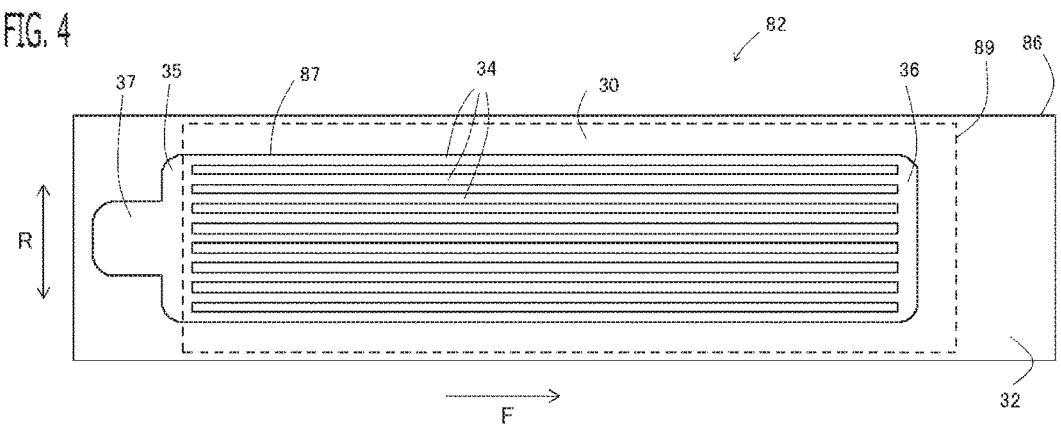
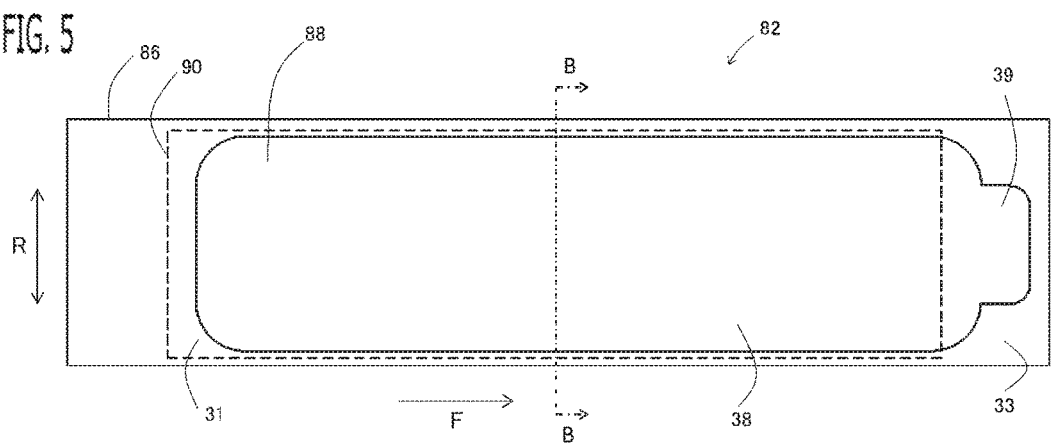

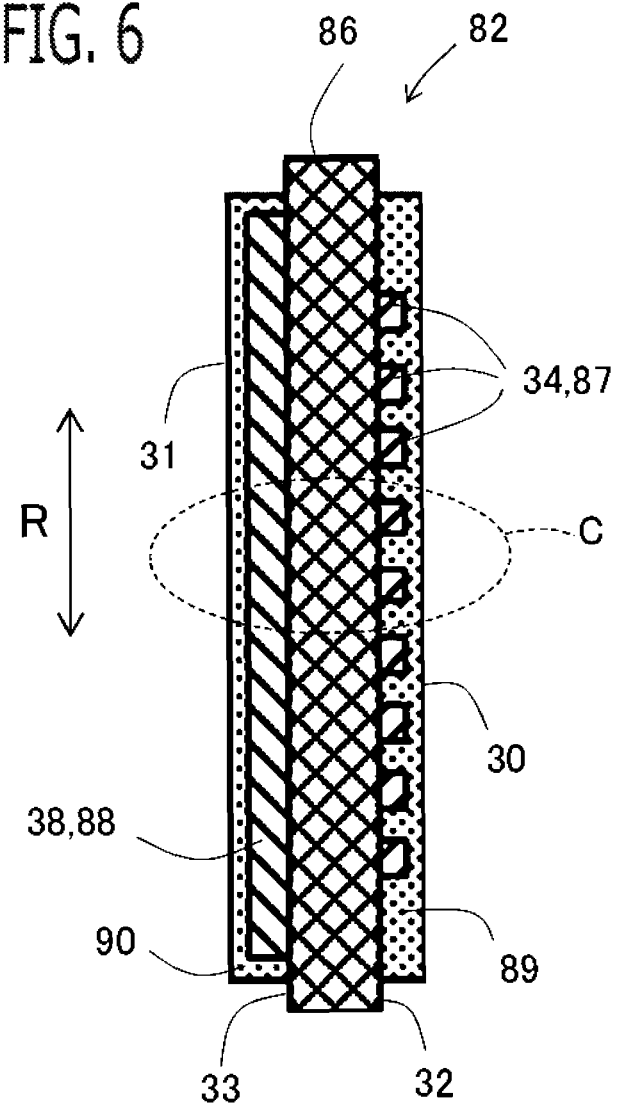

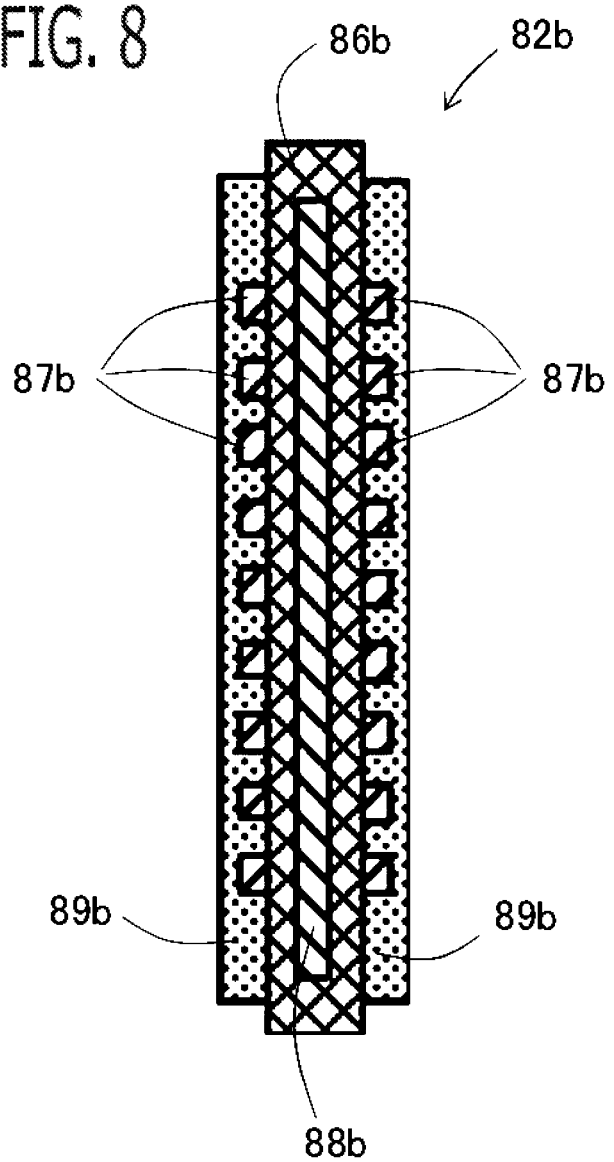

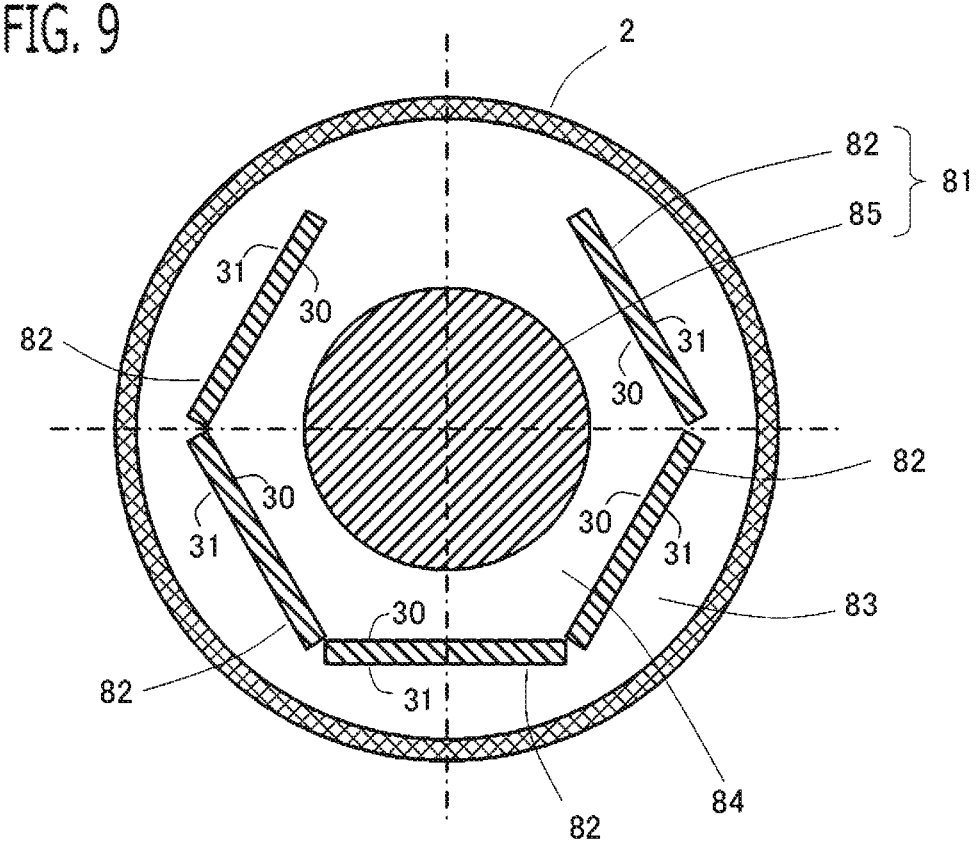

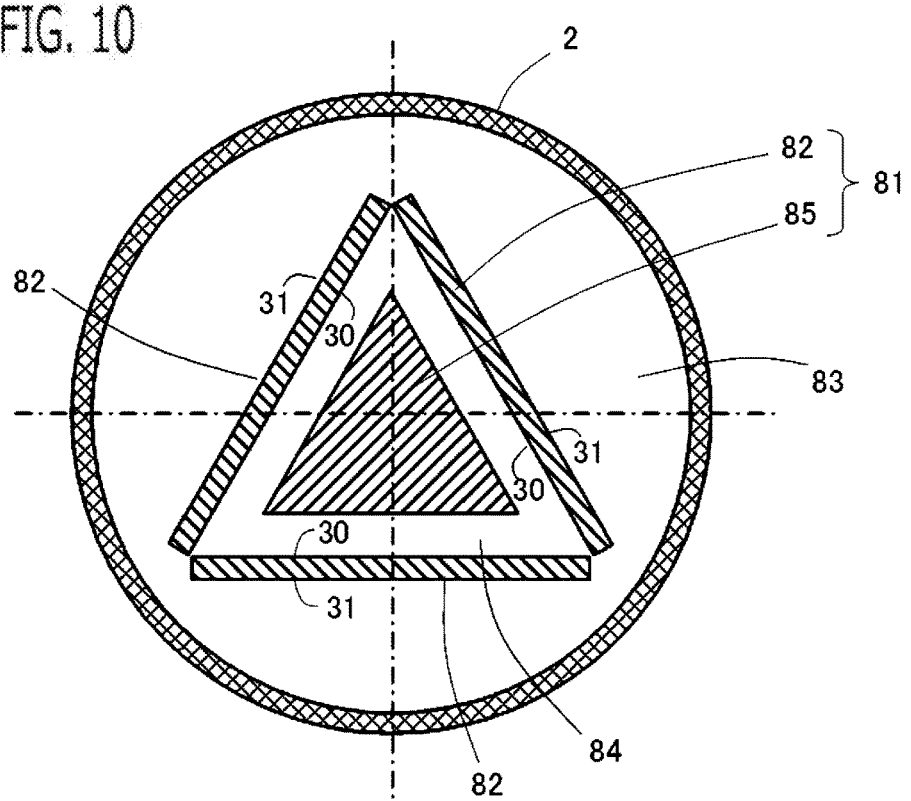
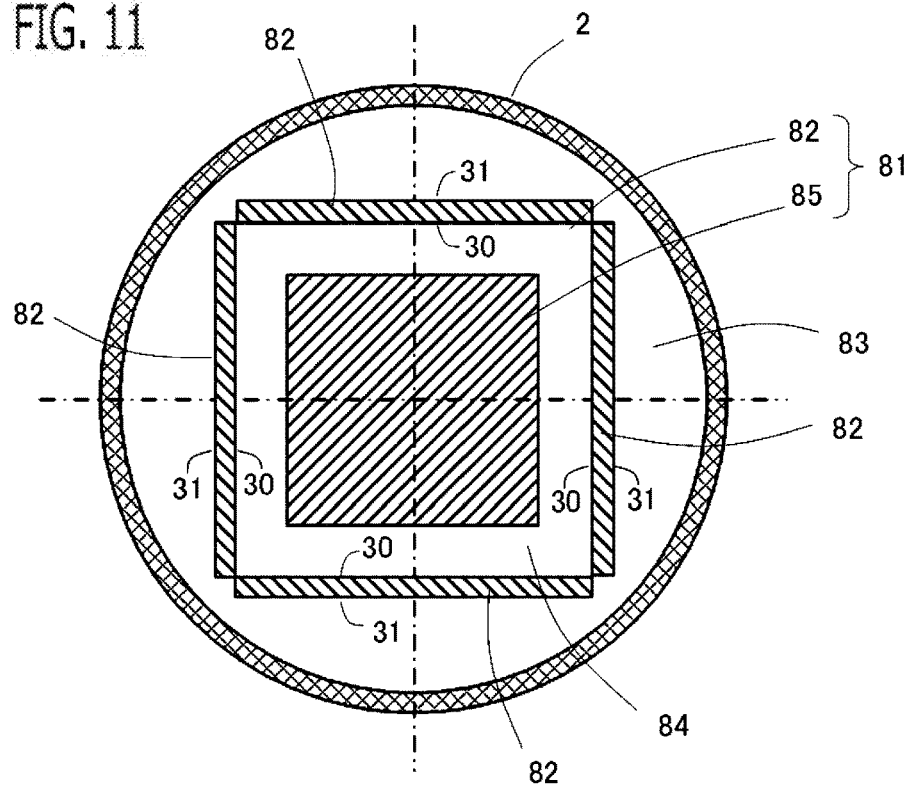

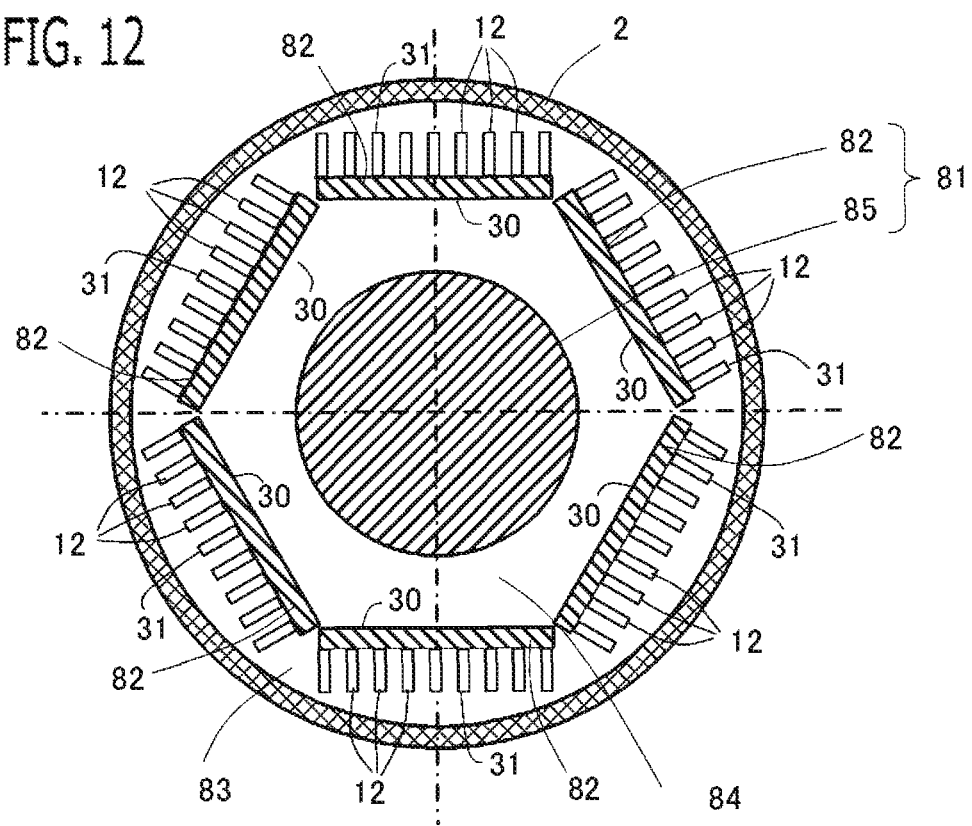

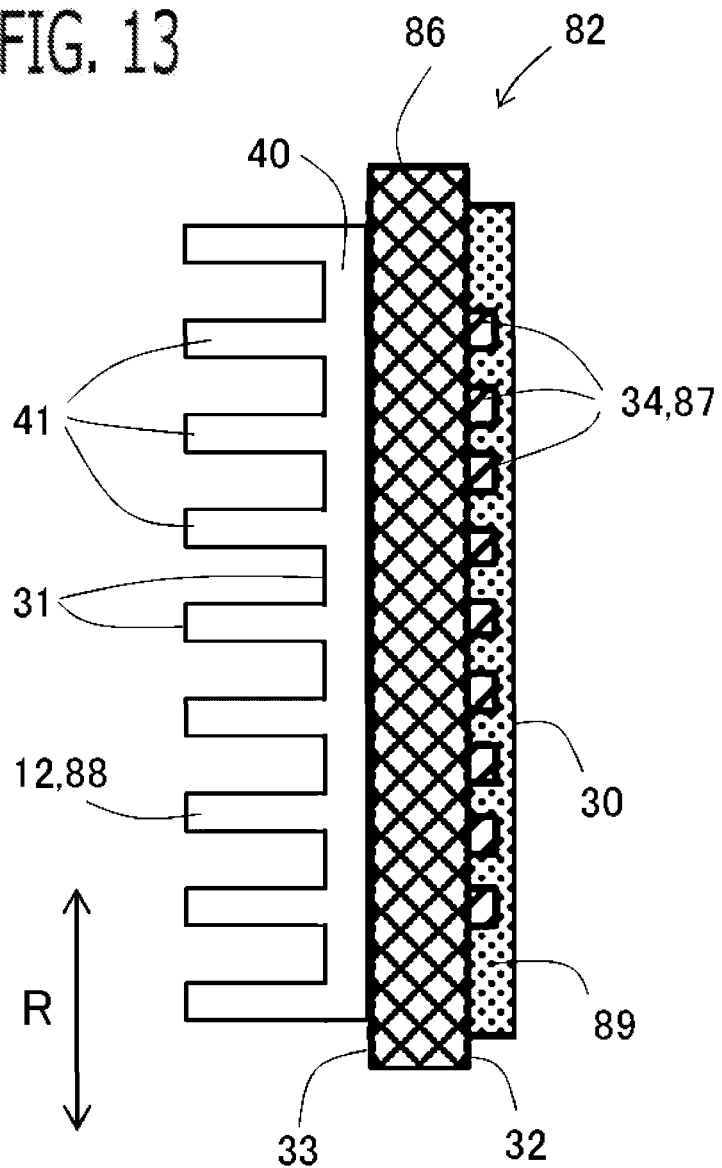

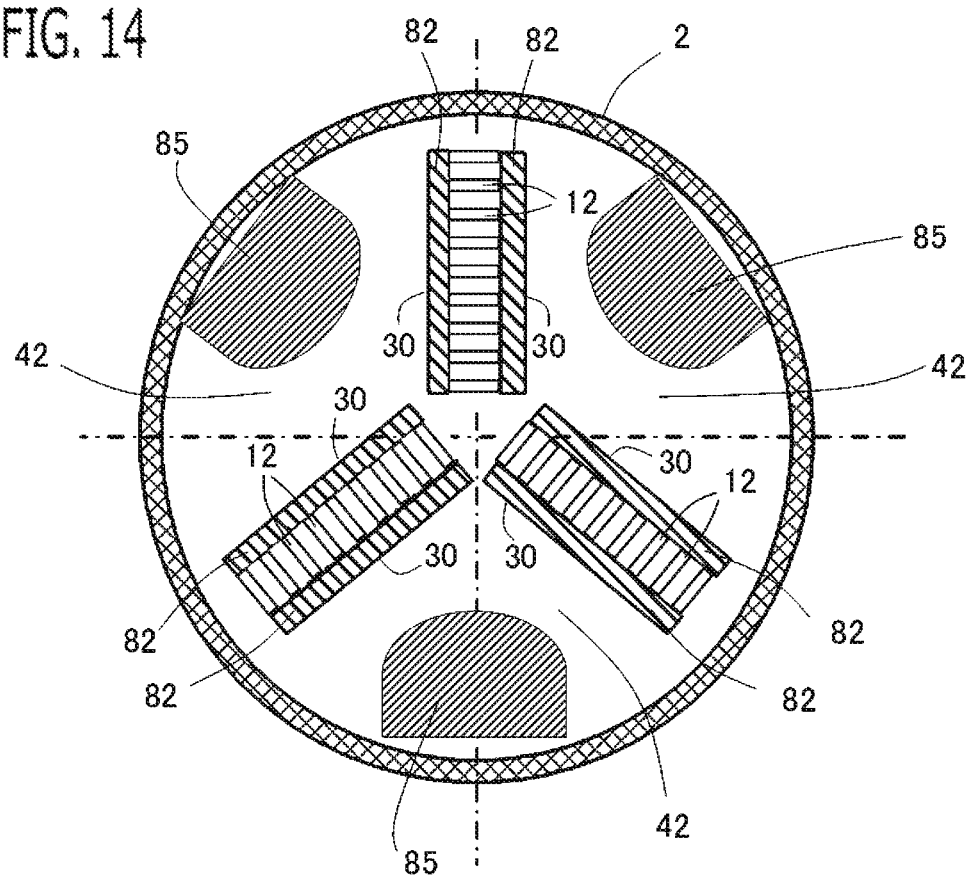

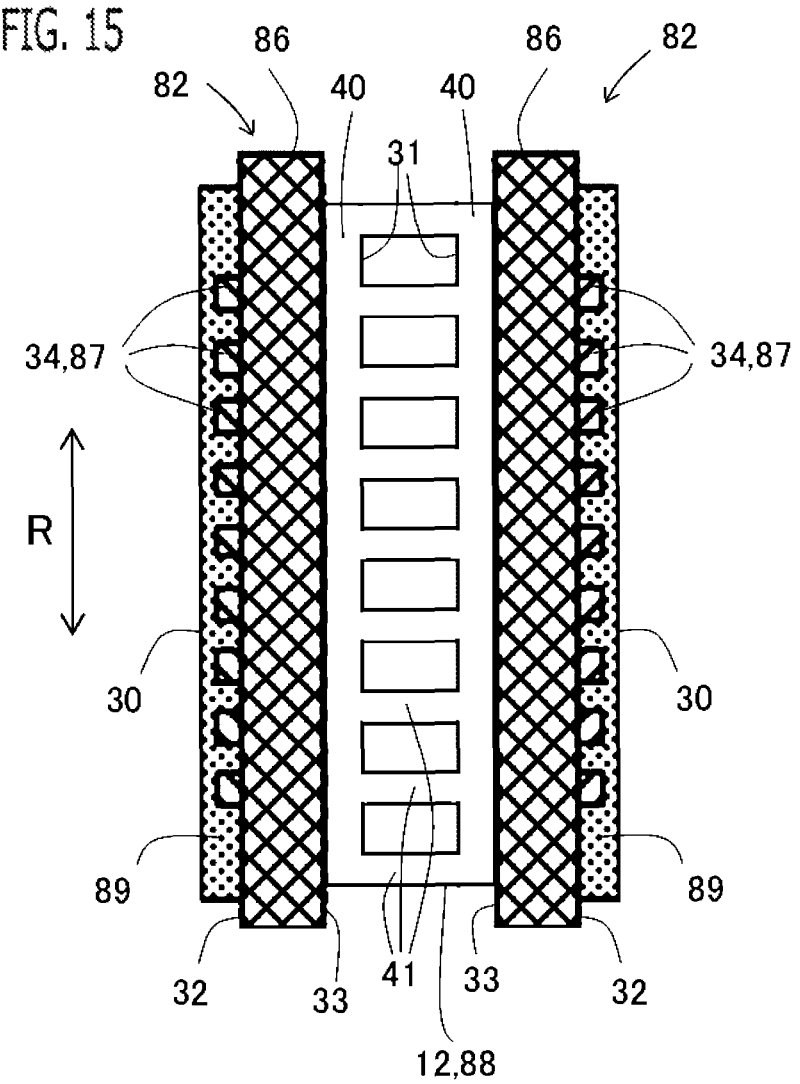

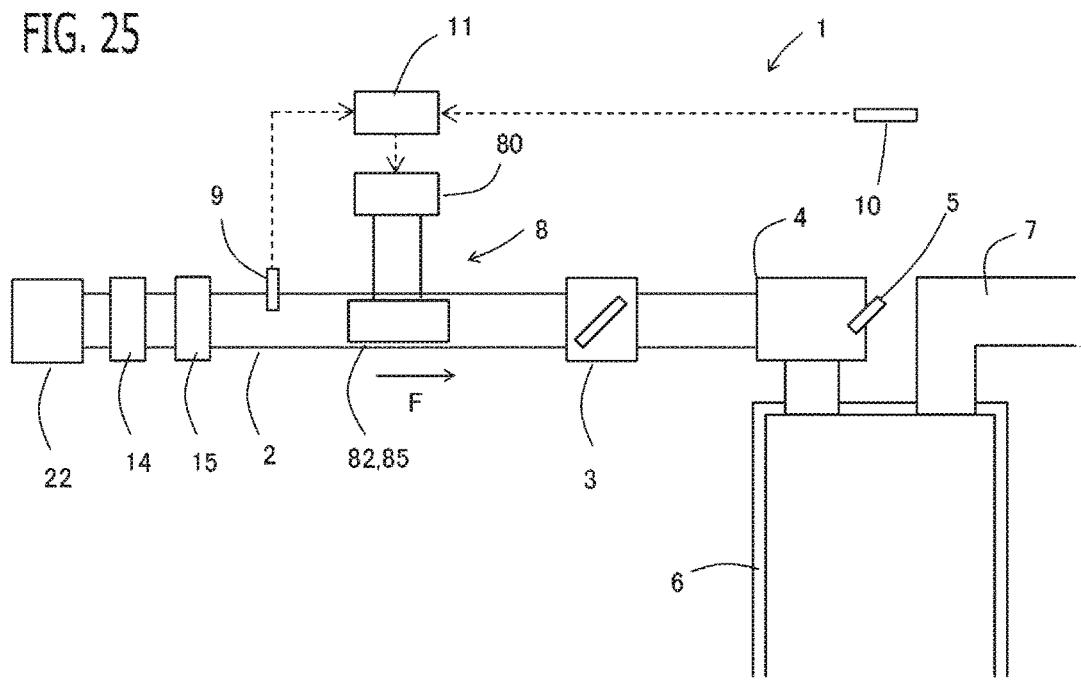
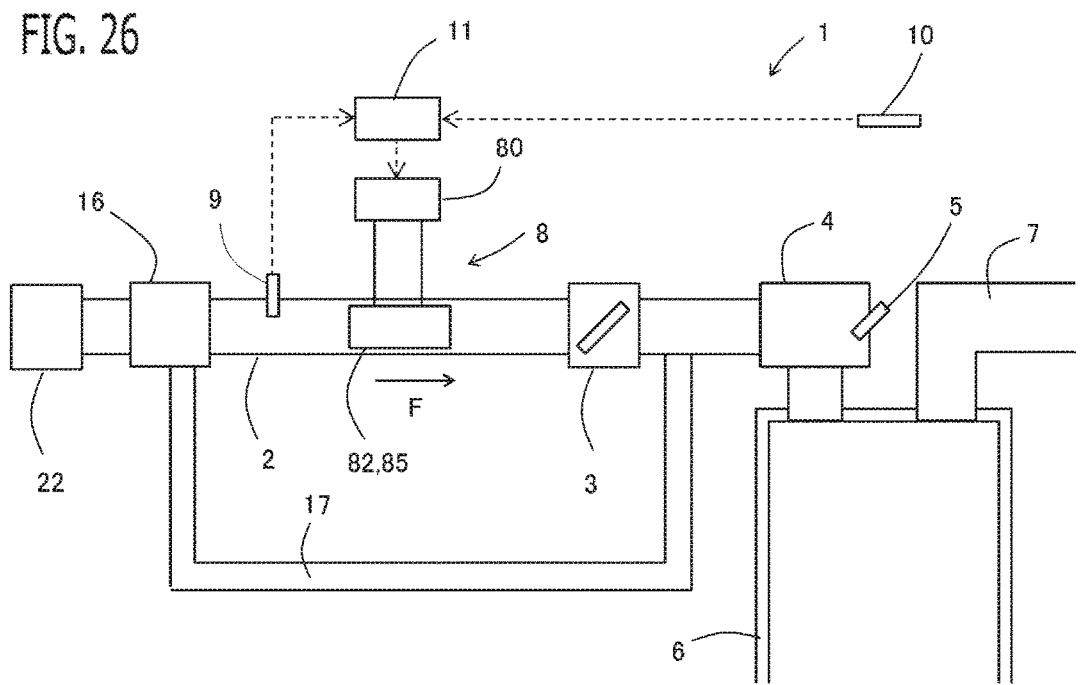

OZONE GENERATOR AND INTERNAL COMBUSTION ENGINE WITH OZONE GENERATOR

TECHNICAL FIELD

The present disclosure relates to an ozone generator for ozonizing intake air and to an internal combustion engine with the ozone generator.

BACKGROUND ART

In general, the combustion types of internal combustion engines are categorized into two types, i.e., the premixed combustion type and the diffusion combustion type. The premixed combustion type is the one in which as exemplified by a gasoline engine, a fuel-air mixture obtained by preliminarily mixing fuel and air is combusted by spark ignition. In contrast, the diffusion combustion type is the one in which as exemplified by a diesel engine, fuel is supplied to high-temperature and high-pressure compressed air so that the fuel is combusted while the fuel and the air are diffused and mixed with each other. Furthermore, in recent years, the premixed compression-ignition combustion type has been drawing attention, as a new combustion type, and development of putting the premixed compression-ignition combustion into practice has been promoted. The premixed compression-ignition combustion type is the one in which a fuel-air mixture obtained by preliminarily mixing fuel and air is combusted by not spark ignition but self-ignition through compression; the premixed compression-ignition combustion is referred to as the HCCI combustion (Homogeneous-Charge Compression Ignition Combustion) and is expected as a next-generation combustion type.

In each of the various kinds of combustion types, application of active species such as an ozone gas and the like to promotion of combustion in an internal combustion engine has been studied. It is allegedly claimed that use of the strong oxidation effect of ozone makes it possible to realize the rise of ignitability in a cylinder of the internal combustion engine, the promotion of combustion, and improvement of gasoline mileage of the internal combustion engine. For example, PLT 1 listed below disclosed an internal combustion engine in which part of intake air is ozonized through silent discharge by use of an ozone generator provided in an intake pipe (intake manifold) of an internal combustion engine and then the intake air including the ozone is supplied into the cylinder. In the ozone generator disclosed in PLT 1, a discharge space through which intake air flows is provided between a ground electrode and a high-voltage electrode that are arranged in such a way as to face each other; silent (space) discharge produced in the discharge space ozonizes the intake air.

As is the case with PLT 1, PLT 2 listed below discloses an internal combustion engine in which an ozone generator is provided in the air inlet of an air cleaner. The ozone generator disclosed in PLT 2 includes a linear discharge electrode provided on the surface of an inductor and an electrode plate provided with induction electrodes that are arranged in such a way as to face each other while pinching the inductor. Creeping discharge produced, around the discharge electrode ozonizes part of intake air, and then the intake air including the ozone is supplied into a cylinder.

CITATION LIST

Patent Literature

PLT 1: JP-A-2013-194712 (Paragraphs 0065 through 0066, FIG. 3)

PLT 2: JP-A-2001-295706 (Paragraphs 0004 through 0008)

SUMMARY OF INVENTION

Technical Problem

However, it is generally understood that because in such a space-discharge ozone generator as disclosed in PLT 1, a dielectric breakdown is caused in the air flowing in the discharge space provided between the electrodes in a pair so that a discharge is produced, the distance between the electrodes in the pair becomes short (for example, 1 mm or smaller). Accordingly, there has been a problem that because in the case where the space-discharge ozone generator is provided in the intake pipe, it is required to make intake air flow in the narrow gap between the electrodes, the ozone generator enlarges a pressure loss in the intake pipe and hence the output of the internal combustion engine is decreased.

Although disclosing a creeping-discharge ozone generator, PLT 2 discloses no specific arrangement configuration in the intake pipe. In a creeping-discharge ozone generator, ozone is produced only in the vicinity of the discharge electrode. Accordingly, in the case where the electrode plate is disposed simply in the intake pipe, most of the intake air does not flow in the vicinity of the discharge electrode and hence is not ozonized; thus, no sufficient, ozone additive rate for the intake air can hardly be obtained. When in order to increase the ozone additive rate, electric power to be applied to the ozone generator is enlarged, the temperature of the electrode plate rises and hence the durability thereof is deteriorated, or the produced ozone may thermally be decomposed; thus, the simple increase in the electric power to be applied does not make it possible to obtain a sufficient effect.

Therefore, there is desired an ozone generator and an internal combustion engine with the ozone generator that can raise the ozone additive rate of the whole intake air, while suppressing the pressure loss in the intake pipe from increasing.

Solution to Problem

An internal combustion engine with an ozone generator according to the present disclosure includes a tubular intake pipe, through an inner region of which air to be taken into a cylinder flows, an ozone generator having an electrode plate that makes ozone produced and is disposed in the inner region or in the intake pipe, and a limiter that limits the flow of the air in the inner region; the electrode plate has a planar dielectric and high-voltage-side and low-voltage-side electrodes adhered and fixed to the dielectric and is formed in the shape of a plate extending in a direction in which the air flows.

An ozone generator according to the present disclosure includes an electrode plate that is disposed in a tubular intake pipe, through an inner region of which air flows, or in the inner region and that makes ozone produced and a limiter that limits the flow of the air in the inner region; the electrode plate has a planar dielectric extending in a direction in which the air flows and high-voltage-side and low-voltage-side electrodes adhered and fixed to the dielectric.

Advantage of Invention

In the ozone generator and the internal combustion engine with the ozone generator according to the present disclosure, the electrode plate is disposed in the inner region of the intake pipe or in the intake pipe; thus, air flowing in the inner region of the intake pipe can be ozonized. Moreover, because the limiter increases the flow rate of intake air, the cooling effect of the intake air for the electrode plate can be raised. As a result, the durability of the electrode plate to heat generation can be raised; in addition, it is made possible that the electric power to be supplied to the electrode plate is increased so that the ozone generation amount is increased. Because the electrode plate is formed in the shape of a plate that extends in a direction in which air in the intake pipe flows, the electrode plate can be suppressed from causing the pressure loss to occur. The limiter limits the flow path in the intake pipe, so that it is made possible to collect air flows in the intake pipe to the vicinity of the electrode plate; thus, the rate of the intake air that is the ozone generation subject can be increased. Accordingly, the ozone additive rate of all the intake air can be increased.

BRIEF DESCRIPTION OF THE DRAWINGS

FIG. 4 is a plan view illustrating the front-side structure of the electrode plate according to Embodiment 1 of the present disclosure;

FIG. 5 is a plan view illustrating the rear-side structure of the electrode plate according to Embodiment 1 of the present disclosure;

FIG. 6 is a cross-sectional view taken along a plane perpendicular to the flowing direction, showing the electrode plate according to Embodiment 1 of the present disclosure;

FIG. 8 is a cross-sectional view taken along a plane perpendicular to the flowing direction, showing an electrode plate according to a comparative example of the present disclosure;

FIG. 9 is a cross-sectional view taken along a plane perpendicular to the flowing direction, showing an intake pipe, electrode plates, and a limiter according to Embodiment 2 of the present disclosure;

FIG. 10 is a cross-sectional view taken along a plane perpendicular to the flowing direction, showing an intake pipe, electrode plates, and a limiter according to Embodiment 3 of the present disclosure;

FIG. 11 is a cross-sectional view taken along a plane perpendicular to the flowing direction, showing an intake pipe, electrode plates, and a limiter according to Embodiment 4 of the present disclosure;

FIG. 12 is a cross-sectional view taken along a plane perpendicular to the flowing direction, showing an intake pipe, electrode plates, and a limiter according to Embodiment 5 of the present disclosure;

FIG. 13 is a cross-sectional view taken along a plane perpendicular to the flowing direction, showing the electrode plate according to Embodiment 5 of the present disclosure;

FIG. 14 is a cross-sectional view taken along a plane perpendicular to the flowing direction, showing an intake pipe, electrode plates, and a limiter according to Embodiment 6 of the present disclosure;

FIG. 15 is a cross-sectional view taken along a plane perpendicular to the flowing direction, showing the electrode plate according to Embodiment 6 of the present disclosure;

FIG. 25 is a schematic configuration diagram representing the apparatus configuration, the control system, the flow system, and the like of an internal combustion engine according to Embodiment 12 of the present disclosure;

FIG. 26 is a schematic configuration diagram representing the apparatus configuration, the control system, the flow system, and the like of an internal combustion engine according to Embodiment 13 of the present disclosure;

DESCRIPTION OF EMBODIMENTS

Embodiment 1

Figure 1:
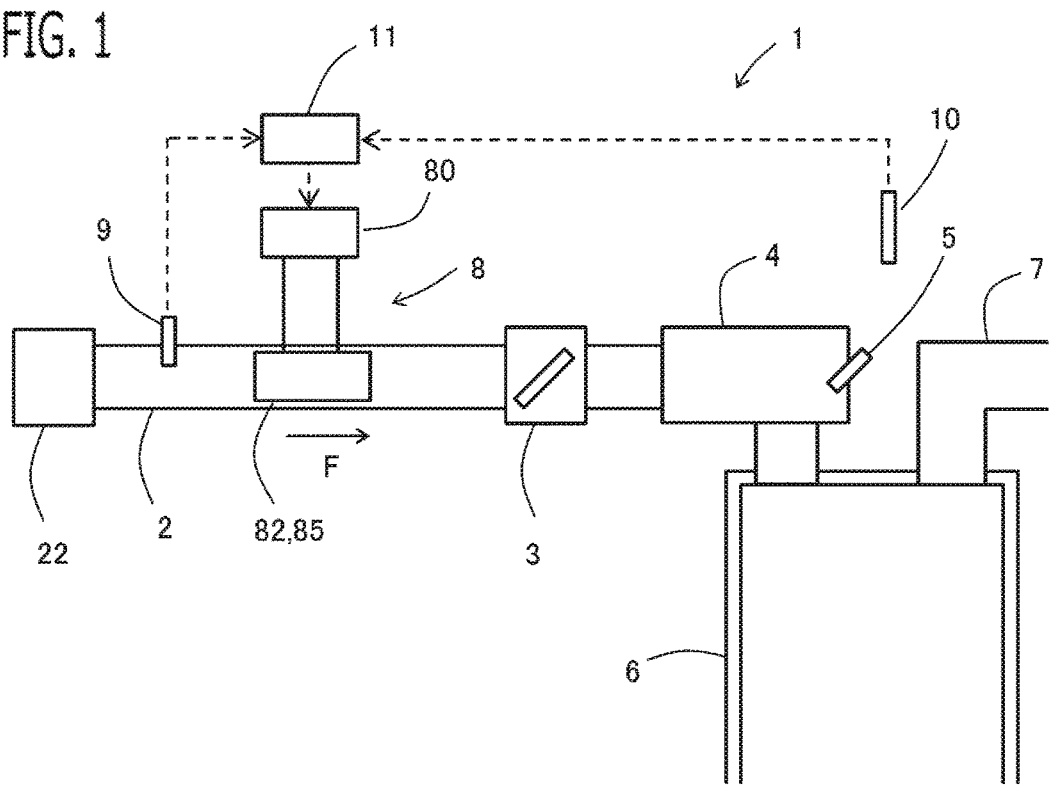
FIG. 1 is a schematic configuration diagram representing the apparatus configuration, the control system, the flow system, and the like of an internal combustion engine according to Embodiment 1 of the present disclosure.
Figure 2:
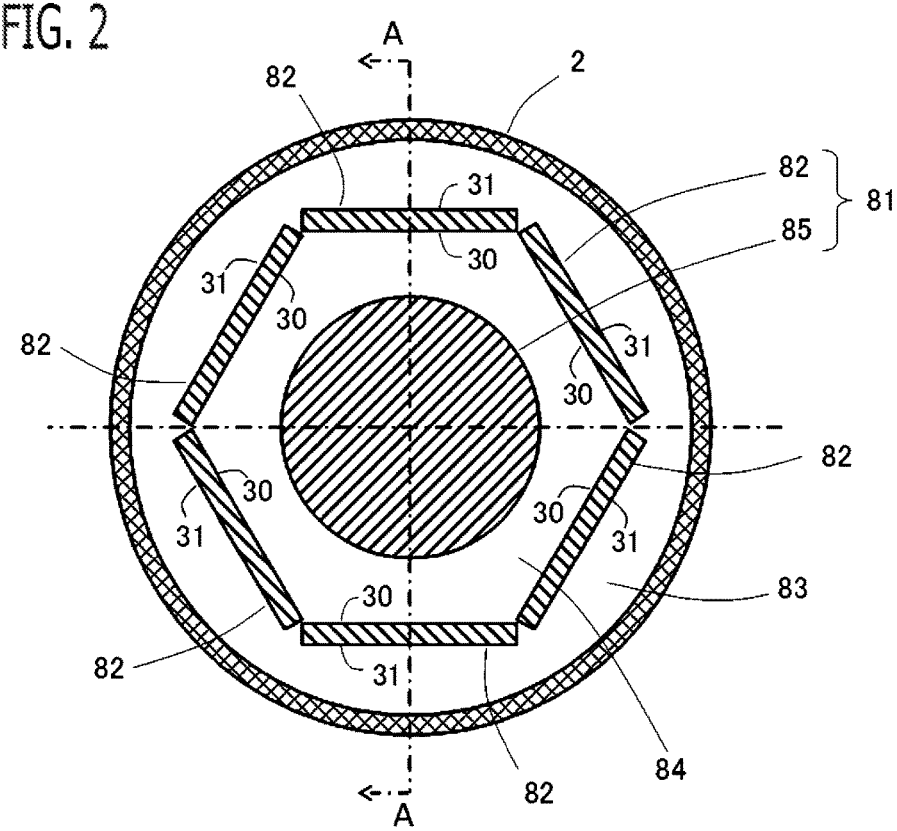
FIG. 2 is a cross-sectional view taken along a plane perpendicular to the flowing direction, showing an intake pipe, electrode plates, and a limiter according to Embodiment 1 of the present disclosure.
Figure 3:
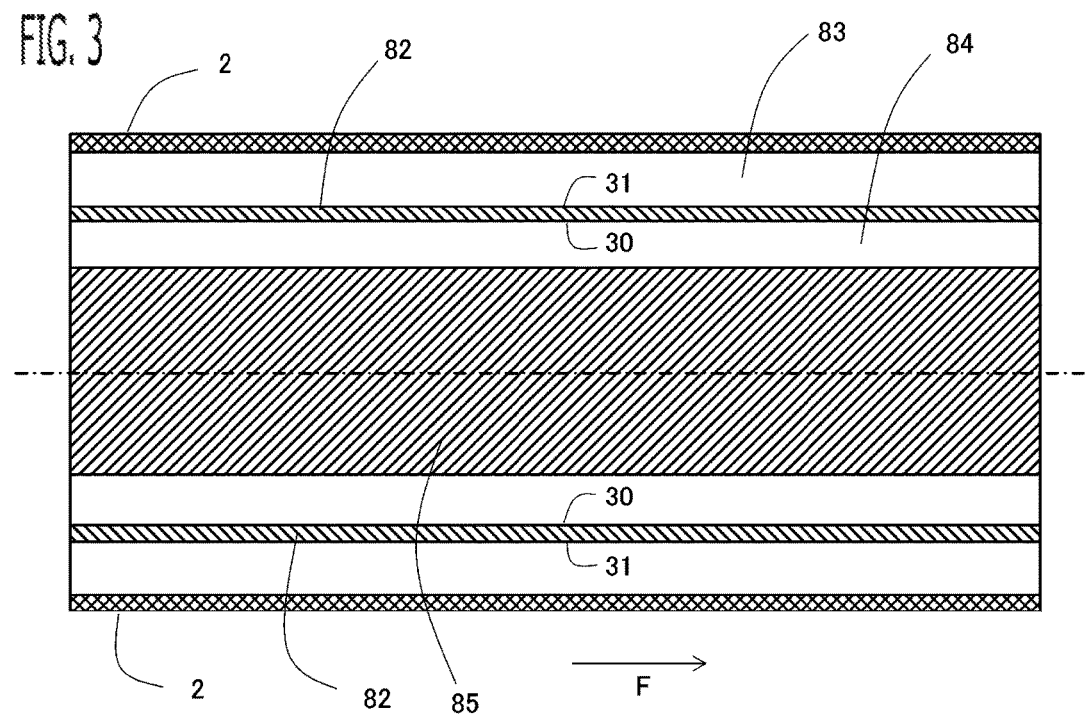
FIG. 3 is a cross-sectional view taken along a plane parallel to the flowing direction, showing the intake pipe, the electrode plates, and the limiter according to Embodiment 1 of the present disclosure.
Figure 7:
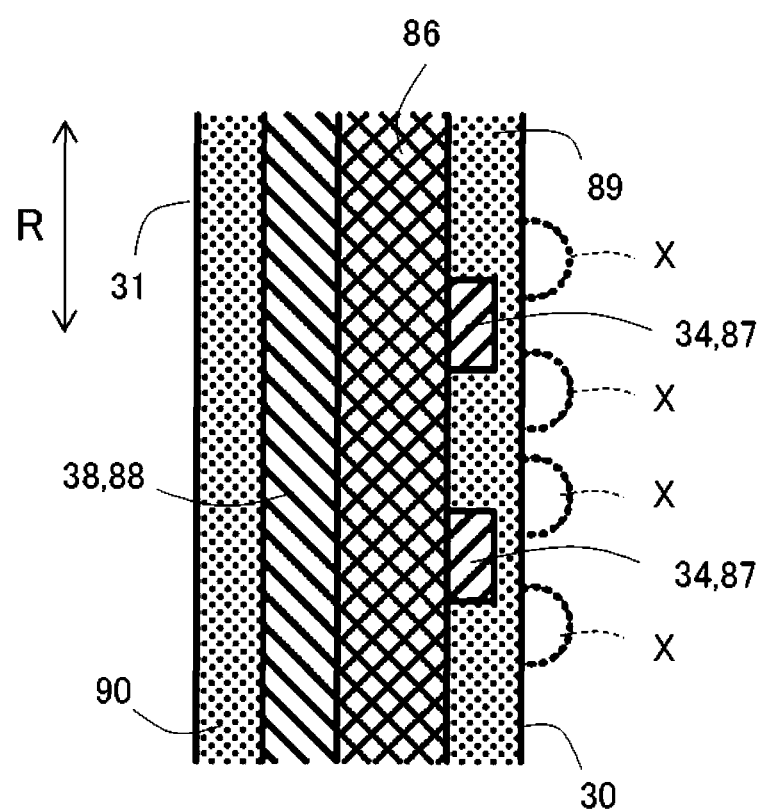
FIG. 7 is an enlarged partial view of FIG. 6.

An internal combustion engine 1 with an ozone generator 8 (hereinafter, referred to simply as an internal combustion engine 1) according to Embodiment 1 will be explained with reference to drawings. FIG. 1 is a schematic configuration diagram representing the apparatus configuration, the control system, the flow system, and the like of the internal combustion engine 1. FIG. 2 is a cross-sectional view taken along a plane perpendicular to a flowing direction F of air in the intake pipe 2, showing the intake pipe 2, electrode plates 82, and a limiter 85. FIG. 3 is a cross-sectional view taken along a plane parallel to the flowing direction F at the A-A cross-sectional position in FIG. 2, showing the intake pipe 2, the electrode plates 82, and the limiter 85. FIG. 4 is a plan view illustrating the structure, at the front side 30, of the electrode plate 82. FIG. 5 is a plan view illustrating the structure, at the rear side 31, of the electrode plate 82. In FIGS. 4 and 5, protection layers 89 and 90, respectively, are seen through and are each indicated by a broken line. FIG. 6 is a cross-sectional view taken along a plane perpendicular to the flowing direction F at the B-B cross-sectional position in FIG. 5, showing the electrode plate 82. FIG. 7 is an enlarged partial view of the C portion in FIG. 6.

The flowing direction F is the flowing direction of air that flows inside a portion of the intake pipe 2, at which the ozone generator 8 (the electrode plates 82) and the limiter 85 are arranged; the flowing direction F is in parallel with the extending direction of the portion of the intake pipe 2.

The configuration of the internal combustion engine 1 according to the present embodiment will be explained. The internal combustion engine 1 is an HCCI (Homogeneous-Charge Compression Ignition) engine. The internal combustion engine 1 is provided with the tubular intake pipe 2 in which air to be taken into a cylinder (combustion chamber) 6 flows. In the present Embodiment, air (intake air) that has passed through an air cleaner 22 and has been taken into the intake pipe 2 passes through a throttle valve 3 and an intake manifold 4 and then is taken into the cylinder (combustion chamber) 6. In this situation, air is taken into the cylinder (combustion chamber) 6, as a premixed gas obtained by mixing the air with a fuel injected from an injector 5 of a so-called port injection type. A combustion gas (an exhaust gas) that has been combusted in the cylinder 6 passes through an exhaust pipe 7 and is exhausted to the outside.

The internal combustion engine 1 has the ozone generator 8. The ozone generator 8 has the electrode plates 82 that makes ozone produced in the surficial vicinity thereof and a driving power source 80 that supplies AC electric power to the electrode plates 82. In the present embodiment, the driving power source 80 can change one of or both of the AC voltage (voltage amplitude) to be supplied to the electrode plates 82 and the AC frequency thereof. The electrode plates 82 are provided in the intake pipe 2 situated between the air cleaner 22 and the throttle valve 3. The ozone generator 8 ozonizes intake air and then supplies a premixed gas including ozone to the cylinder 6.

An air flow sensor 9 is provided in the intake pipe 2 situated between the air cleaner 22 and the ozone generator 8 and measures the flow rate of intake air flowing in the intake pipe 2. The internal combustion engine 1 has various kinds of driving-condition detection sensors 10 such as a crank angle sensor, a cam angle sensor, and the like. The internal combustion engine 1 is provided with a control apparatus 11 that performs operation control of the internal combustion engine 1. In FIG. 1, the broken lines indicate representative control signal lines that pass through the control apparatus 11. The respective output signals of the air flow sensor 9 and the driving-condition detection sensors 10 are inputted to the control apparatus 11. Based on the respective output signals of the air flow sensor 9 and the driving-condition detection sensors 10, the control apparatus 11 controls various kinds of actuators such as the injector 5, the throttle valve 3 and the like so as to perform operation control of the internal combustion engine 1. As one of the operation control items, the control apparatus 11 controls the driving power source 80. Specifically, the control apparatus 11 changes one of or both of the AC voltage to be supplied from the driving power source 80 and the AC frequency thereof, in accordance with the driving condition of the internal combustion engine 1. As a result, an appropriate amount of ozone can be added to intake air of the internal combustion engine 1. For example, in order to maintain the ozone concentration in the intake air, the control apparatus 11 enlarges AC electric power to be supplied from the driving power source 80, as the intake air flow rate increases.

It is desired that the intake pipe 2 reduces the pressure loss caused by taking in air as much as possible. If the pressure loss increases, the air amount to be taken into the cylinder 6 decreases; thus, the output, of the internal combustion engine 1 is reduced. Therefore, it is required to suppress the ozone generator 8 provided in the intake pipe 2 from increasing the pressure loss. For example, it is desired that the pressure loss from the air inlet to the intake manifold 4 is less than 1 kPa. However, in the case where unlike the present Embodiment, there is utilized a space-discharge ozone generator in which a discharge is caused in intake air introduced into electrodes facing each other with a gap so that ozone is produced, it is required to make the gap between the electrodes narrow (e.g., substantially 1 mm). Accordingly, the ozone generator drastically increases the pressure loss and hence it is difficult to achieve a required performance.

Thus, in the present Embodiment, as described later, the ozone generator 8 is not the space-discharge type but a type (the creeping-discharge type, in the present example) in which a discharge is caused along the front side 30 of the electrode plate 82, on which a nigh-voltage-side electrode 87 is provided.

In the case of a space-discharge ozone generator, all of the intake air introduced into the discharge space is exposed to a discharge and becomes a subject of ozonization. In contrast, in the case of a creeping-discharge ozone generator, as described later, the discharge occurrence region is limited to the region in the vicinity of the front side 30 of the electrode plate 82; thus, the air flowing the region apart, from the front side 30 is not the subject of ozonization. Therefore, only providing the front side 30 of the electrode plate 82 inside the intake pipe 2 hardly increases the ozone concentration of all of the intake air.

It is conceivable that in order to increase the ozone generation amount of the electrode plate 82, the AC voltage to be supplied to the electrode plate 82 is increased so that the electric power density of the electrode plate 82 is increased. However, although it is made possible to increase the ozone concentration of the air flowing in the vicinity of the electrode plate 82 up to the upper limit, increasing the ozone concentration of all of the intake sir has a limit. Because an excessive increase in the electric power density causes the temperature of the electrode plate 82 to rise, deterioration of the durability of the electrode plate 82 and thermal decomposition of produced ozone may be caused. Accordingly, there exists a limit in the increase of the ozone concentration of all of the intake air through the increase of the electric power density. Thus, it is required to increase the ozone concentration of all of the intake air by a method other than the method of increasing the electric power density.

Therefore, as illustrated in each of FIGS. 2 and 3, the internal combustion engine 1 has the limiter 85 for partially limiting the flow path at a portion of the intake pipe 2, in which the electrode plate 82 is disposed. As illustrated in FIGS. 4 through 7, the electrode plate 82 has a planar dielectric 86, the high-voltage-side electrodes 87 adhered and fixed to the front, side 32 of the dielectric 86, and a low-voltage-side electrode 88 adhered and fixed to a rear side 33 of the dielectric 86. The electrode plate 82 is formed in the shape of a plate that extends in the flowing direction F of air in the intake pipe 2. At least the front side 30 (the high-voltage-side electrode 87), of the electrode plate 82, that is a side to which the high-voltage-side electrode 87 is adhered and fixed is exposed in the inner region of the intake pipe 2 and makes contact with air flowing in the inner region of the intake pipe 2.

This configuration causes a discharge to occur on the front side 30 of the electrode plate 82, on which the high-voltage-side electrode 37 is provided, and hence makes it possible to ozonize the oxygen in the air in the vicinity of the front side 30. Because the front side 30 of the electrode plate 82 is exposed to the inside of the intake pipe 2, it is made possible to ozonize the air flowing in the intake pipe 2. The front side 30 of the electrode plate 82 generates heat due to the discharge; however, the rear side 31 of the electrode plate 82 does not generate heat due to a discharge, because it is a non-discharge side. Therefore, the heat can efficiently be radiated from the rear side 31 of the electrode plate 82 and hence the electrode plate 82 can effectively be cooled. Because the limiter 85 increases the flow rate of intake air, the cooling effect of the intake air for the electrode plate 82 can be raised. As a result, the durability of the electrode plate 82 to heat generation can be raised; in addition, it is made possible that the electric power to be supplied to the electrode plate 82 is increased so that the ozone generation amount is increased.

FIG. 8 illustrates a cross-sectional view of an electrode plate 82b according to a comparative example that is different from the present embodiment. In the electrode plate 82b of the comparative example, a planar low-voltage-side electrode 88b is provided at the central portion; respective planar dielectrics 86b are adhered ana fixed to the both sides of the low-voltage-side electrode 88b. Respective high-voltage-side electrodes 87b are adhered and fixed to the both-side dielectrics 86b; the both-side high-voltage-side electrodes 87b are coated with respective protection layers 89b. Thus, in the electrode plate 82b of the comparative example, the both sides thereof are discharge sides, in each of which the high-voltage-side electrodes 87b are provided. Because in the electrode plate 82b of the comparative example, the discharge area increased, the increase in the ozone generation amount can be expected. However, in practice, when the electric power to be supplied is enlarged, the heat generation amount surpasses the heat radiation amount on the both sides of the electrode plate 82; thus, when the durability and the thermal decomposition of ozone are considered, it is eventually compelled to decrease the electric power to be supplied and hence the ozone generation amount is reduced.

In the foregoing configuration, the electrode plate 82 is formed in the shape of a plate that extends in the flowing direction F of air in the intake pipe 2; thus, it is made possible to suppress the electrode plate 82 from causing the pressure loss to occur. Ozone is produced in the vicinity of the front side 30 of the electrode plate 82. The limiter 85 limits the flow path in the intake pipe 2, so that it is made possible to collect air flows in the intake pipe 2 to the vicinity of the electrode plate 82; thus, the rate of the intake air that is the ozone generation subject can be increased. Accordingly, the ozone concentration of all the intake air can be increased.

The "front side" and the "rear side" are terms that are conveniently utilized for distinguishing one side of each of the planar electrode plate 82 and dielectric 86 from the other side thereof; the side that makes ozone produced through a discharge is referred to as the "front", and the side that does not make ozone produced is referred to as the "rear". Alternatively, the side of the electrode plate 82, on which the high-voltage-side electrode 87b is provided is referred to as the "front", and the side opposite to the side on which the high-voltage-side electrode 87b is provided is referred to as the "rear". Because the terms are conveniently utilized, it is also made possible that the "front side" is referred to as "a first side" and the "rear side" is referred to as "a second side".

In the present Embodiment, as illustrated in each of FIGS. 2 and 3, the rear side 31 of the electrode plate 82 is also exposed in the inner region of the intake pipe 2 and makes contact with air that flows in the inner region. This configuration makes it possible that the rear side 31 of the electrode plate 82 is efficiently cooled by the air flowing in the intake pipe 2. For example, when as described above, the AC electric power to be supplied to the electrode plate 82 is increased as the intake air flow rate increases, the heat generation amount in the electrode plate 82 increases. However, due to the increased intake air flow rate, the heat radiation amount on each of the rear side 31 and the front side 30 of the electrode plate 82 also increases; thus, the temperature rise in the electrode plate 82 can effectively be suppressed. Accordingly, it is made possible to suppress the deterioration of the durability and the thermal decomposition of produced ozone, which are caused by the temperature rise in the electrode plate 82. Moreover, instead of the water cooling type, which is often adopted in a space-discharge ozone generator, the air cooling type can be utilized; thus, the apparatus can be simplified and downsized.

The limiter 85 and the front side 30 of the electrode plate 82 face each in such a way as to be spaced apart from each other. This configuration makes it possible, that by adjusting the relative arrangement configuration of the electrode plate 82 and the limiter 85, such as adjusting the gap between the front side 30 of the electrode plate 82 and the limiter 85, air flows are appropriately collected to the vicinity of the front, side 30 of the electrode plate 82; thus, the ozone generation efficiency can be raised.

The limiter 85 is formed in the shape of a column extending in the flowing direction F (the extending direction of the intake pipe 2) of air and is disposed at the central portion of the intake pipe 2. The electrode plates 82 are provided in the respective directions in which the front sides 30 thereof face the outer circumferential surface of the limiter 85 and in such a way as to surround the circumference of the limiter 85 via a gap. That is to say, the front side 30 of the electrode plate 82 is oriented to the central side of the intake pipe 2. This configuration makes it possible that the single limiter 85 disposed at the central portion efficiently adjusts the distance from the front, side 30 of the electrode plate 82 provided therearound. Because the electrode plates 82 are provided in such a way as to surround the circumference of the limiter 85 provided at the central portion, it is made possible to widen the surface area of the front, side 30 of the electrode plate 82; thus, the ozone generation amount can be increased and the cooling effect for the front side 30 can be raised.

The electrode plates 82 are provided in the respective directions in which the rear sides 31 thereof face the inner circumferential surface of the intake pipe 2 and in such a way as to surround the intake pipe 2 via a gap from the inside. This configuration makes it possible that the rear side 31 of the electrode plate 82 is cooled by the air flowing in a space 83 between the intake pipe 2 and the electrode plate 82. The air amount to be utilized for cooling the rear side 31 can be adjusted by adjusting the gap between the intake pipe 2 and the electrode plate 82. The surface area of the rear side 31 of the electrode plate 82 can be widened and hence the cooling effect for the electrode plate 82 can be raised.

In the present embodiment, the intake pipe 2 is formed in the shape of a cylindrical tube; the limiter 85 is formed in the shape of a cylindrical column provided at the center of the intake pipe 2. The electrode plate 82 is disposed in the cylindrical tubular space between the intake pipe 2 and the limiter 85. The cross-sectional area of the limiter 85 is adjusted in such a way as not to surpass the allowable value (e.g., 1 kPa) of the pressure loss in the intake pipe 2. At the upstream side, in the flowing direction F, of the portion thereof that faces the electrode plate 82, the limiter 85 may have a taper portion that becomes narrower in the direction toward the upstream side; alternatively, at the downstream side, in the flowing direction F, of the portion thereof that faces the electrode plate 82, the limiter 85 may have a taper portion that becomes narrower in the direction toward the downstream side. The taper portion can suppress the limiter 85 from causing the pressure loss to occur. As described above, because the limiter 85 is formed in the shape of a cylindrical column provided at the center of the intake pipe 2, the rate of the increase in the pressure loss to the increase in the cross-sectional area of the limiter 85 can be reduced.

The electrode plate 82 is formed in the shape of a rectangular flat plate; two or more (six, in this example) electrode plates 82 are provided. The two or more electrode plates 82 are circumferentially arranged close to one another over the whole circumference of the limiter 85 in such a way as to surround the circumference of the limiter 85. When viewed in the flowing direction F, the six electrode plates 82 are arranged in the shape of a hexagon whose center is the center of the intake pipe 2. The front side 30 and the rear side 31 of each of the electrode plates 82 are in parallel with the flowing direction F; the sides of each of the electrode plates 82 are in parallel with the flowing direction F.

As described above, the two or more electrode plates 82 divides the flow path in the intake pipe 2 into a tubular space 84 situated inside the electrode plates 82 and a tubular space 83 situated outside the electrode plates 82. The space 84 situated inside the electrode plates 82 becomes a space in which ozonized air flows; the space 83 situated outside the electrode plates 82 becomes a space in which unozonised air flows. The limiter 85 is provided at the central portion of the space 84 situated inside the electrode plates 82.

A plurality of electrode plates 82 and the limiter 85 are connected with each other by means of fixing members (unillustrated) and form a modularized electrode module 81. For example, the plurality of electrode plates 82 and the limiter 85 are pinched from the both sides by insulative fixing members provided at the upstream and downstream sides so as to be fixed to the intake pipe 2; electric insulation from the surroundings is secured, and the plurality of electrode plates 82 and the limiter 85 are durable to the vibration of the internal combustion engine 1. The fixing member is formed of a rod-shaped member, a planar member, or the like that can suppress obstruction of the air flow.

The electrode plate 82 makes ozone produced through creeping discharge on the front side 30 thereof. In principle, in a creeping discharge type, the voltage to be applied can be set to a voltage that is lower than that in a space discharge type; thus, the power source circuit of the driving power source 80 can be simplified and downsized.

In the present embodiment, as illustrated in FIGS. 4 through 7, the electrode plate 82 is formed in the shape of a rectangular flat plate that extends in the flowing direction F. The rectangular longitudinal sides are in parallel with the flowing direction F, and the rectangular transverse sides are perpendicular to the flowing direction F. The dielectric 86 is formed in the shape of a rectangular plate that extends in the flowing direction F. The rectangular longitudinal sides are in parallel with the flowing direction F, and the rectangular transverse sides are perpendicular to the flowing direction F.

As illustrated in FIGS. 4 and 6, the high-voltage-side electrode 87 is formed in the shape of a rectangular flat, plate that extends in the flowing direction F, substantially along the front side 32 of the dielectric 86, Describing in detail, the high-voltage-side electrode 87 has two or more (nine, in this example) rod-shaped (square-timber-shaped, in this example) electrode portions 34 that are arranged in such a way as to be spaced apart from one another in a perpendicular direction R, which is perpendicular to the flowing direction F, and extend in the flowing direction F. The high-voltage-side electrode 87 has a flat-plate first electrode connecting portion 35 that connects the respective upstream-side end portions of the two or more rod-shaped electrode portions 34 and extends in the perpendicular direction R that is perpendicular to the flowing direction F. The high-voltage-side electrode 87 has a flat-plate second electrode connecting portion 36 that connects the respective downstream-side end portions of the two or more rod-shaped electrode portions 34 and extends in the perpendicular direction R that is perpendicular to the flowing direction F. Describing in another manner, the high-voltage-side electrode 87 has a shape in which on a rectangular flat plate, two or more slits extending in the flowing direction F are formed in the perpendicular direction R that is perpendicular to the flowing direction F. As illustrated in FIG. 7, a creeping discharge, which travels from the edge portion of the rod-shaped electrode portion 34 to the gap (slit) between the electrode portions 34, occurs in a region X along the front side 30 of the electrode plate 82. Accordingly, a creeping discharge occurs along the gap (slit) between the rod-shaped electrode portions 34. Thus, the air flowing in the vicinity of the front side 30 of the electrode plate 82 is ozonized due to the creeping discharge.

As illustrated in FIG. 4, the high-voltage-side electrode 87 has a flat-plate high-voltage connecting terminal 37 extending from the first electrode connecting portion 35 to the upstream side and is connected with the high-voltage power source terminal of the driving power source 80. The high-voltage power source terminal of the driving power source 80 outputs an AC voltage. Because the high-voltage connecting terminal 37 is disposed at the upstream side of the rod-shaped electrode portion 34 that produces ozone, the connection portion thereof hardly undergoes corrosion caused by the ozone. When the corrosion of the connection portion can be prevented, the high-voltage connecting terminal 37 may be provided at the downstream side of the rod-shaped electrode portion 34.

As illustrated in FIG. 5, the low-voltage-side electrode 88 is formed in the shape of a rectangular flat plate that extends in the flowing direction F, substantially along the rear side 33 of the dielectric 86. Describing in detail, the low-voltage-side electrode 88 has a round-corner-rectangular flat-plate electrode portion 38 that extends in the flowing direction F. The electrode portion 38 of the low-voltage-side electrode 88 is disposed at the opposite side of the electrode portion 34 of the high-voltage-side electrode 87, via the dielectric 86. In other words, the electrode portion 34 of the high-voltage-side electrode 87 and the electrode portion 38 of the low-voltage-side electrode 88 are arranged at the respective positions that overlap with each other, when viewed in a direction that, is perpendicular to the front side 30 or the rear side 31 of the electrode plate 82.

The low-voltage-side electrode 88 has a flat-plate low-voltage connecting terminal 39 that extends from the electrode portion 38 to the downstream side and is connected with the low-voltage power source terminal of the driving power source 80. The low-voltage power source terminal of the driving power source 80 is the ground terminal. Because the low-voltage connecting terminal 39 is disposed at the downstream side, which is the opposite side, via the dielectric 86, of the high-voltage connecting terminal 37 disposed at the upstream side, it is made possible that the high-voltage connecting terminal 37 and the low-voltage connecting terminal 39 are hardly short-circuited. When the short-circuit can be prevented, the low-voltage connecting terminal 39 may be disposed at the same side of the high-voltage connecting terminal 37.

As illustrated in FIGS. 4 and 6, a protection layer 89 covers the electrode portions 34 of the high-voltage-side electrode 87 and the region of the front side 32 of the dielectric 86, on which the electrode portions 34 are arranged. Because the electrode portion 34 can be protected by the protection layer 89, it is made possible to prevent ozone from corroding the electrode portion 34 and to prevent the discharge from deteriorating the electrode portion 34. The surface of the protection layer 89 forms the front side 30 of the electrode plate 82. As illustrated in FIGS. 5 and 6, a protection layer 90 covers the electrode portions 38 of the low-voltage-side electrode 88 and the region of the rear side 33 of the dielectric 86, on which the electrode portions 38 are arranged. Because the electrode portion 38 can be protected by the protection layer 90, it is made possible to prevent ozone from corroding the electrode portion 38 and to prevent the discharge from deteriorating the electrode portion 34.

As the dielectric 86, for example, a glass plate made of borosilicate glass, Pyrex (registered trademark), quartz, or the like is utilized, or a ceramic plate made of alumina, titanium oxide, aluminum nitride, barium titanate, or the like is utilized. As the material of each of the high-voltage-side electrode 87 and the low-voltage-side electrode 88, metal such as stainless steel, aluminum, gold, silver, copper, tungsten, titanium, phosphor bronze, or beryllium copper is utilised, or the compound of these metal materials is utilized. As each of the materials of the protection layer 89 and 90, an inorganic material such as glass, silicon dioxide, alumina, titanium oxide, tungsten trioxide, or a catalyst containing noble metal is utilized, or fluororesin such as PTFE or PEA is utilized. It is desirable that each of the materials of the protection layers 89 and 90 has water repellency. This is because moisture in the intake air can hardly stay on the surface of the electrode plate 82.

Although it may change depending on the specification of the internal combustion engine 1, the outer diameter of the intake pipe 2 is substantially 60 mm$\phi$ in the present Embodiment; the length of the intake pipe 2, with which the ozone generator 8 can be provided therein, is substantially 150 mm. As described above, the electrode module 81 in which around the limiter 85, the two or more electrode plates 82 are nexagonally combined is contained in part of the intake pipe 2. The width, the length, and the thickness of each of the electrode plates 82 are substantially 25 mm, 100 mm, and 1 mm, respectively.

In the present embodiment, the high-voltage-side electrode 87 includes nine rod-shaped electrode portions 34. As explained with reference to FIG. 7, because a discharge starts from the edge portion of the rod-shaped, electrode portion 34, the number of discharge portions increases, as the number of the electrode portions 34 increases. In contrast, when the number of the electrode portions 34 is too small, the ozone generation amount per electrode plate 82 cannot sufficiently be secured. Accordingly, in the case of the electrode plate 82 having such a size as described in the present Embodiment, it is desirable that the number of the electrode portions 34 per electrode plate 82 is the same as or larger than five. However, when the number of the electrode portions 34 is too large, the pitch between the depression and protrusion formed by the electrode portions 34 on the front side 32 of the dielectric 86 becomes so narrow that the degree of adhesion of the protection layer 89 to the dielectric 86 and the high-voltage-side electrode 87 is reduced and hence the protection layer 89 is insufficiently formed. Accordingly, it is desirable that the number of the electrode portions 34 per electrode plate 82 is substantially ten at most. The desirable number of the electrode portions 34 changes in accordance with the size of the electrode plate 82. Chamfering may be applied to the respective edge portions of the electrode portion 34 of the high-voltage-side electrode 87 and the electrode portion 38 of the low-voltage-side electrode 88 in order to reduce electric-field concentration thereon.

The size of the intake pipe 2 and the rated intake air flow rate are determined by the specification of the internal combustion engine 1. It is desirable that the respective sizes of the limiter 85 and the electrode plate 82 and the arrangement, thereof are adjusted so that the intake air that flows in the intake pipe 2 becomes turbulence-state. The turbulence state makes it possible to largely raise the heat transfer rate of the surface of the electrode plate 82 in comparison with a laminar-flow state; thus, the cooling effect for the electrode plate 82 can be raised.

As described above, in the internal combustion engine 1 according to the present Embodiment, the electrode plate 82 of a creeping discharge type and the limiter 85 are provided in the intake pipe 2; thus, it is made possible that while the pressure loss in the intake pipe 2 is suppressed from increasing, the rate of intake air, which is the ozone generation subject, is increased and that the cooling effect, for the electrode plate 82, of the intake air, is raised. Accordingly, the ozone generation amount of the intake air can largely be increased; thus, it is made possible to improve the flammability and the ignitability of a fuel-air mixture in the cylinder 6 and hence to raise the gasoline mileage of the internal combustion engine 1.

Embodiment 2

Next, an internal combustion engine 1 according to Embodiment 2 will be explained. The explanation for constituent parts that are the same as those in Embodiment 1 will be omitted. The basic configuration and the operation of the internal combustion engine 1 according to the present embodiment are the same as those of the internal combustion engine 1 according to Embodiment 1; however, Embodiment 2 is different, from Embodiment 1 in terms of the respective shapes of the electrode plate 82 and the limiter 85 provided in the intake pipe 2 and the arrangement thereof. FIG. 9 is a cross-sectional view taken along a plane perpendicular to the flowing direction F, showing an intake pipe 2, electrode plates 82, and a limiter 85 according to the present embodiment.

As is the case with Embodiment 1, the limiter 85 is formed in the shape of a column extending in the flowing direction F and is disposed at the central portion of the intake pipe 2. The electrode plates 82 are provided in the respective directions in which the front sides 30 thereof face the outer circumferential surface of the limiter 85 and in such a way as to surround the circumference of the limiter 85 via a gap. The intake pipe 2 is formed in the shape of a cylindrical tube; the limiter 85 is formed in the shape of a cylindrical column provided at the center of the intake pipe 2. Two or more rectangular flat-plate electrode plates 82 are circumferentially arranged in such a way as to surround the circumference of the limiter 85.

However, in the present Embodiment, unlike Embodiment 1, part, in the circumferential direction, of the outer circumferential surface of the limiter 85 is not surrounded by the electrode plates 82. Describing in detail, five electrode plates 82—one of the six electrode plates 82 hexagonally combined in Embodiment 1 has been removed—are arranged, in a shape in which an opening portion, is provided. In other words, the five electrode plates 82 are circumferentially arranged close to one another in such a way as to surround the circumference of the limiter 85, while an opening is provided at one position in the circumferential direction.

It may be allowed that the intake pipe 2 is transparent or a transparent window is provided at a portion, of the intake pipe 2, that is the outside of the opening portion of the electrode plates 82 and that an electroluminescence detection sensor is provided at the outside of the transparent portion, of the intake pipe 2. The electroluminescence detection sensor detects whether or not discharge; light has been generated inside the electrode plate 82 or detects the strength and the weakness thereof, through the transparent portion of the intake pipe 2 and the opening portion of the electrode plate 82. It may be allowed that the output signal of the electroluminescence detection sensor is inputted to the control apparatus 11 and the control apparatus 11 changes one of or both of the AC voltage to be supplied to the electrode plate 82 and the AC frequency thereof in accordance with whether or not discharge light has been generated or the strength and the weakness thereof. This configuration makes it possible to apply feedback control to the ozone generation state.

Embodiment 3

Next, an internal combustion engine 1 according to Embodiment 3 will be explained. The explanation for constituent parts that are the same as those in Embodiment 1 will be omitted. FIG. 10 is a cross-sectional view taken along a plane perpendicular to the flowing direction F, showing an intake pipe 2, electrode plates 82, and a limiter 85 according to the present embodiment.

As is the case with Embodiment 1, the limiter 85 is formed in the shape of a column extending in the flowing direction F and is disposed at the central portion of the intake pipe 2. The electrode plates 82 are provided in the respective directions in which the front sides 30 thereof face the outer circumferential surface of the limiter 85 and in such a way as to surround the circumference of the limiter 85 via a gap. The intake pipe 2 is formed in the shape of a cylindrical tube.

However, in the present Embodiment, unlike Embodiment 1, the limiter 85 is formed, in the shape of a triangular prism provided at the center of the intake pipe 2. When viewed in the flowing direction F, three electrode plates 82 that are each formed in the shape of a rectangular flat, plate are arranged in the shape of a triangle whose center is the center of the intake pipe 2. The front side 30 of each of the electrode plates 82 and the corresponding side face of the limiter 85 having a triangular-prism shape are arranged in parallel with each other through a constant gap.

Embodiment 4

Next, an internal combustion engine 1 according to Embodiment 4 will be explained. The explanation for constituent parts that are the same as those in Embodiment 1 will be omitted. FIG. 11 is a cross-sectional view taken along a plane perpendicular to the flowing-direction F, showing an intake pipe 2, electrode plates 82, and a limiter 85 according to the present embodiment.

As is the case with Embodiment 1, the limiter 85 is formed in the shape of a column extending in the flowing direction F and is disposed at the central portion of the intake pipe 2. The electrode plates 82 are provided in the respective directions in which the front sides 30 thereof face the outer circumferential surface of the limiter 85 and in such a way as to surround the circumference of the limiter 85 via a gap. The intake pipe 2 is formed in the shape of a cylindrical tube.

However, in the present Embodiment, unlike Embodiment 1, the limiter 85 is formed in the shape of a quadrangular-prism pillar provided at the center of the intake pipe 2. When viewed in the flowing direction F, four electrode plates 82 that are each formed in the shape of a rectangular flat, plate are arranged in the shape of a quadrangle whose center is the center of the intake pipe 2. The front side 30 of each of the electrode plates 82 and the corresponding side face of the limiter 85 having the shape of a quadrangular-prism pillar are arranged in parallel with each other through a constant gap.

Embodiment 5

Next, an internal combustion engine 1 according to Embodiment 5 will be explained. The explanation for constituent parts that are the same as those in Embodiment 1 will be omitted, FIG. 12 is a cross-sectional view taken along a plane perpendicular to the flowing direction F, showing an intake pipe 2, electrode plates 82, and a limiter 85 according to the present embodiment. FIG. 13 is a cross-sectional view taken along a plane perpendicular to the flowing direction F, showing the electrode plate 82.

As illustrated in FIG. 13, in the present Embodiment, unlike Embodiment 1, a set of heat radiation fins 12 is provided on the rear side 31 of the electrode plate 82. The set of heat radiation fins 12 makes it possible to increase the heat radiation amount from the rear side 31 of the electrode plate 82. As a result, the durability of the electrode plate 82 to heat generation can further be raised; in addition, it is made possible that the voltage to be supplied to the electrode plate 82 is increased so that the ozone generation amount is further increased.

In the present embodiment, the set of heat radiation fins 12 is integrated with the low-voltage-side electrode 88. In other words, the set of heat radiation fins 12 has a rectangular flat-plate base portion 40 to be adhered and fixed to the rear side 33 of the dielectric 86 and a plurality of protruding portions 41 that protrude from the base portion 40. The base portion 40 is included in the low-voltage-side electrode 88 similar to that in Embodiment 1; the protruding portions 41 are included in the set of heat radiation fins. The protruding portions 41 are each formed in the shape of a rectangular flat plate extending in the normal direction of the rear side 33 of the dielectric 86 and are arranged in such a way as to be spaced apart from one another in the perpendicular direction R. Because extending in the flowing direction F, the protruding portion 41 can efficiently be cooled by intake air and can suppress the pressure loss. Alternatively, it may be allowed that the protruding portions 41 are each formed in the shape of a column (e.g., a quadrangular prism) protruding in the normal direction of the rear side 33 of the dielectric 86 and are arranged in such a way as to be spaced apart from one another in the perpendicular direction R and in the flowing direction F, The set of heat radiation fins 12 may be formed as a member separated from the low-voltage-side electrode 88. For example, it maybe allowed that the set of heat radiation fins 12 and the dielectric 86 are bonded with each other, through the intermediary of the low-voltage-side electrode 88 having the shape of a flat plate the same as that in Embodiment 1. This method facilitates adhesion of the low-voltage-side electrode 88 to the dielectric 86 and suppression of ineffective discharge.

As illustrated in FIG. 12, as is the case with Embodiment 1, the limiter 85 is formed in the shape of a column extending in the flowing direction F and is disposed at the central portion of the intake pipe 2. The electrode plates 82 are provided in the respective directions in which the front sides 30 thereof face the outer circumferential surface of the limiter 85 and in such a way as to surround the circumference of the limiter 85 via a gap. The intake pipe 2 is formed in the shape of a cylindrical tube; the limiter 85 is formed in the shape of a cylindrical column provided at the center of the intake pipe 2. Six electrode plates 82 are arranged in the shape of a hexagon whose center is the center of the intake pipe 2.

The electrode plates 82 are provided in the respective directions in which the set of heat radiation fins 12 face the inner circumferential surface of the intake pipe 2 and in such a way as to surround the intake pipe 2 from the inside, via a gap between the inner circumferential surface of the intake pipe 2 and the set of heat radiation fins 12. The set of heat radiation fins 12 can be cooled by the air flowing in the space 83 between the intake pipe 2 and the electrode plate 82.

Embodiment 6

Next, an internal combustion engine 1 according to Embodiment 6 will be explained. The explanation for constituent parts that are the same as those in Embodiment 1 will be omitted. FIG. 14 is a cross-sectional view taken along a plane perpendicular to the flowing direction F, showing an intake pipe 2, electrode plates 82, and limiters 85 according to the present embodiment. FIG. 15 is a cross-sectional view taken along a plane perpendicular to the flowing direction F, showing a pair of electrode plates 82.

As illustrated in FIG. 15, in the present Embodiment, unlike Embodiment 1, a pair of the electrode plates 82 are arranged in such a way as to be spaced apart from each other in a direction in which the respective rear sides 31 thereof face each other. In this configuration, as is the case with the comparative example illustrated in FIG. 8, the two respective sides of a pair of electrode plates 82 become the front sides 30 on which discharge occurs; thus, the discharge area can be increased. On the other hand, unlike the comparative example in FIG. 8, it is made possible that intake air is introduced into the space between the pair of the electrode plates 82 so that the respective rear sides 31 of the two electrode plates 82 are simultaneously cooled. Accordingly, the pair of the electrode plates 82 can effectively be cooled; thus, it is made possible that the electric power to be supplied is enlarged so that the ozone generation amount is increased. The pair of the electrode plates 82 are each formed in the shape of a rectangular flat plate having one and the same size and are arranged in parallel with each other.

In the present embodiment, the respective heat radiation fins 12 are provided on the rear sides 31 of the pair of the electrode plates 82. The heat radiation fins 12 lies between the respective rear sides 31 of the pair of the electrode plates 82. The neat radiation fins 12 make it possible that the amount of heat radiation by the air introduced into the space between the pair of the electrode plates 82 is raised. Moreover, the heat radiation fins 12 make it possible that the pair of the electrode plates 82 are connected each other and are modularized. The heat radiation fins 12 make it possible to reduce temperature nonuniformity between the pair of the electrode plates 82.

In the present embodiment, the set of heat radiation fins 12 is integrated with the low-voltage-side electrode 88. In other words, the set of heat radiation fins 12 has two rectangular flat-plate base portions 40 to be adhered and fixed to the respective rear sides 33 of a pair of the dielectrics 86 and a plurality of protruding portions 41 that protrude from the two respective base portions 40 and connect the two base portions 40. The base portion 40 is included in the low-voltage-side electrode 88 similar to that in Embodiment 1; the protruding portions 41 are included in the set of heat radiation fins. The protruding portions 41 are each formed in the shape of a rectangular flat plate extending in the flowing direction F and in the normal direction of the rear side 33 of the dielectric 86 and are arranged in such a way as to be spaced apart from one another in the perpendicular direction R. Alternatively, it may be allowed that the protruding portions 41 are each formed in the shape of a column (e.g., a quadrangular prism) extending in the normal direction of the rear side 33 of the dielectric 86 and are arranged in such a way as to be spaced apart, from one another in the perpendicular direction R and in the flowing direction F.

The set of heat radiation fins 12 may be formed as a member separated from the low-voltage-side electrode 88. For example, it may be allowed that the set of heat radiation fins 12 and the dielectric 86 are bonded with each other, through the intermediary of the low-voltage-side electrode 88 having the shape of a flat plate the same as that in Embodiment 1. This method facilitates adhesion of the low-voltage-side electrode 88 to the dielectric 86 and suppression of ineffective discharge.

As illustrated in FIG. 14, in the present. Embodiment, when viewed in the flowing direction F, two or more (three, in this example) pairs of the electrode plates 82 are radially arranged with respect to the center of the intake pipe 2. The respective electrode plates 82 are arranged in such a way as to radially extend with respect to the center of the intake pipe 2 and in such a way as to extend in the flowing direction F. A limiter 85 is provided in each of two or more (three, in this example) spaces 42, in the intake pipe 2, that are circumferentially divided by the two or more pairs of the electrode plates 82. Each of the two or more (three, in this example) limiters 85 face the respective, front sides 30 of two adjacent electrode plates 82 via a gap. In this configuration, it is made possible that by use of the limiter 85 provided in each of the circumferential-direction spaces 42, the distance from the front side 30 of the electrode plate 82 provided in the vicinity of the limiter 85 is individually adjusted. Each of the limiters 85 is formed in the shape of a semicylinder extending in the flowing direction F and is disposed close to the inner circumferential surface of the intake pipe 2 in a direction in which the arc face thereof faces the central portion of the intake pipe 2.

Embodiment 7

Figure 16:
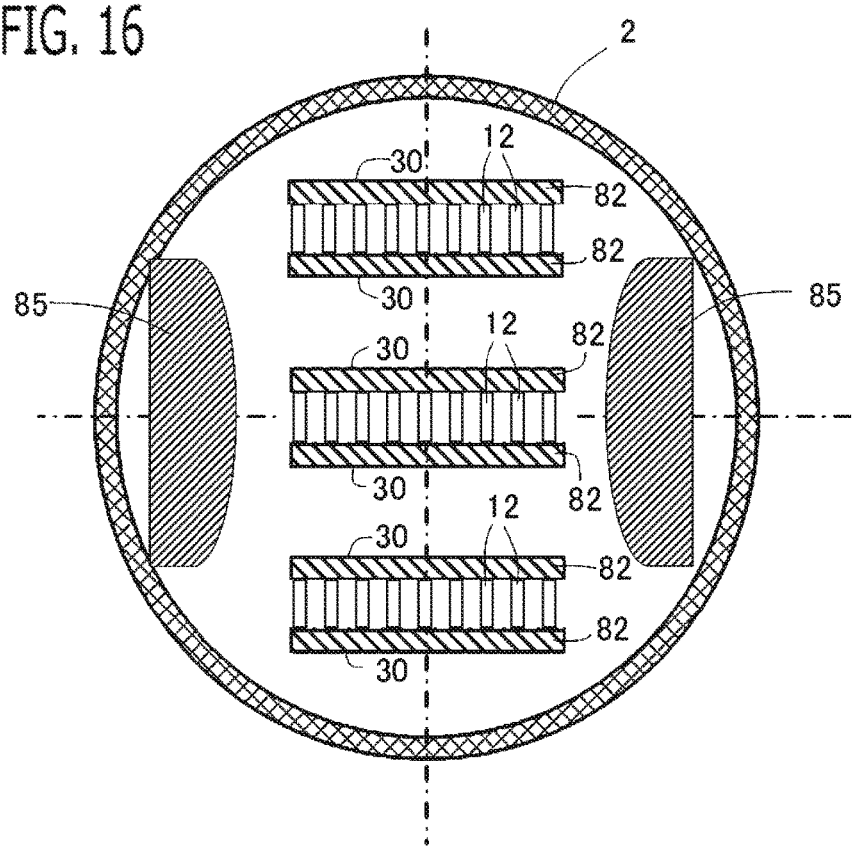
FIG. 16 is a cross-sectional view taken along a plane perpendicular to the flowing direction, showing an intake pipe, electrode plates, and a limiter according to Embodiment 7 of the present disclosure.

Next, an internal combustion engine 1 according to Embodiment 7 will be explained. The explanation for constituent parts that are the same as those in Embodiment 1 will be omitted. FIG. 16 is a cross-sectional view taken along a plane perpendicular to the flowing direction F, showing an intake pipe 2, electrode plates 82, and limiters 85 according to the present, embodiment. In the present embodiment, a pair of dielectrics 86, which is similar to that, in Embodiment 5, is provided.

In the present Embodiment, two or more (three, in this example) pairs of the electrode plates 82 are arranged in a row in such a way as to be spaced apart from one another in a direction in which the respective front sides 30 thereof face each other. The limiter 85 is provided at each of the both sides of the region where the two or more pairs of the electrode plates 82 are arranged. Describing in detail, each of the limiters 85 is disposed at the both sides of the two or more pairs of the electrode plates 82 in a direction perpendicular to the direction in which the two or more pairs of the electrode plates 82 are arranged, in such a way as to be spaced apart from the two or more pairs of the electrode plates 82. Each of the limiters 85 is formed in the shape of a semicylinder extending in the flowing direction F and is disposed close to the inner circumferential surface of the intake pipe 2 in a direction in which the arc face thereof faces the central portion (the electrode plate 82) of the intake pipe 2. The limiter 85 limits the flow path in the intake pipe 2, so that it is made possible to collect air flows in the intake pipe 2 to the vicinity of the electrode plate 82; thus, the rate of the intake air that, is the ozone generation subject can be increased, and the cooling effect of the intake air can be raised.

Embodiment 8

Figure 17:
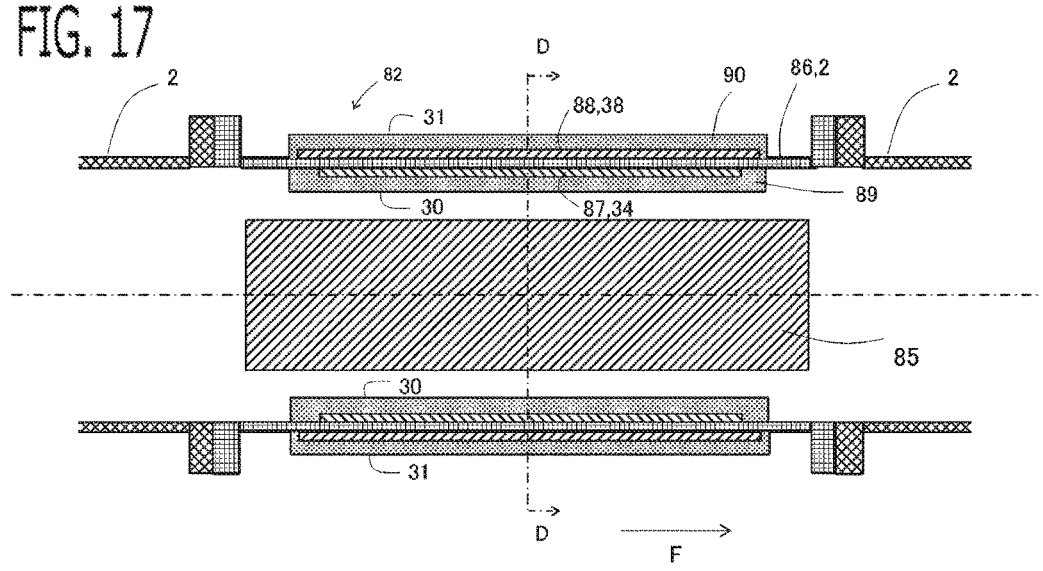
FIG. 17 is a cross-sectional view taken along a plane parallel to the flowing direction, showing an intake pipe, electrode plates, and a limiter according to Embodiment 8 of the present disclosure.
Figure 18:
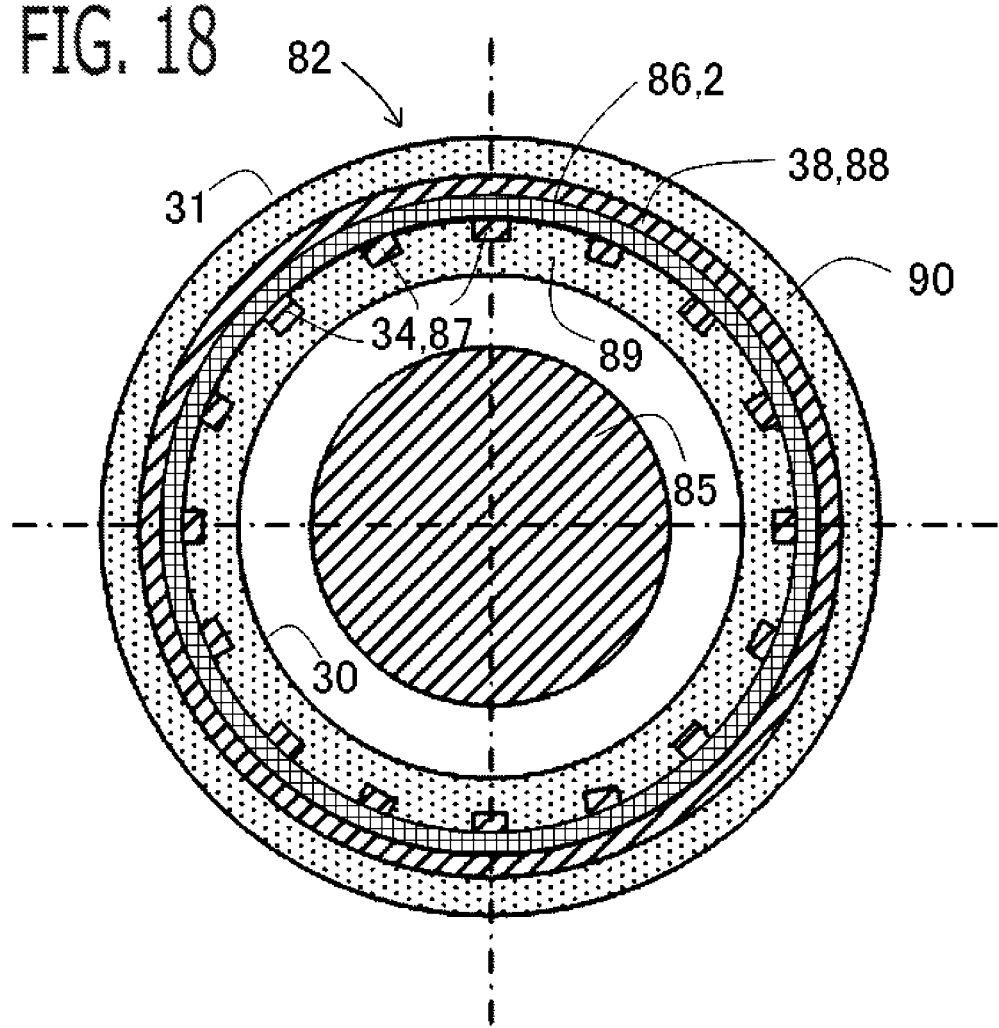
FIG. 18 is a cross-sectional view taken along a plane perpendicular to the flowing direction, showing an intake pipe, electrode plates, and a limiter according to Embodiment 8 of the present disclosure.

Next, an internal combustion engine 1 according to Embodiment 8 will be explained. The explanation for constituent, parts that are the same as those in Embodiment 1 will be omitted. FIG. 17 is a cross-sectional view taken along a plane parallel to the flowing direction F, showing an intake pipe 2, electrode plates 82, and limiters 85 according to the present embodiment. FIG. 18 is a cross-sectional view taken along a plane perpendicular to the flowing direction F, showing an intake pipe 2, an electrode plate 82, and a limiter 85.

In the present Embodiment, unlike Embodiment 1, the electrode plate 82 is formed in the shape, of a tube, and is included in the intake pipe 2. The front side 30 of the electrode plate 82 is included in the inner circumferential surface of the intake pipe 2; the rear side 31 of the electrode plate 82 is included in the outer circumferential surface of the intake pipe 2. The limiter 85 is formed in the shape of a column (a cylindrical tube, in this example) extending in the flowing direction F and is disposed at the central portion of the intake pipe 2. In this configuration, the front side 30 of the electrode plate 82 is provided in a direction in which it faces the outer circumferential surface of the limiter 85 and in such a way as to surround the circumference of the limiter 85 via a gap. Thus, as is the case with foregoing Embodiment 1, it is made possible that the single limiter 85 disposed at the central portion efficiently adjusts the distance from the front side 30 of the electrode plate 82 provided there around. Because the inner circumferential surface of the intake pipe 2 is the front side 30 of the electrode plate 82, the surface area of the front side 30 can be widened; therefore, the ozone generation amount can be increased and the cooling effect for the front side 30 can be raised. The rear side 31 of the electrode plate 82 is exposed to the outside of the intake pipe 2; however, a current of cooling air produced by a cooling fan provided in the internal combustion engine 1 and a current of traveling air produced by travel of a vehicle efficiently cool the rear side 31 of the electrode plate 82. Because the outer circumferential surface of the intake pipe 2 is the rear side 31 of the electrode plate 82, the surface area of the rear side 31 can be widened and hence the cooling effect for the electrode plate 82 can be raised.

The dielectric 86 is formed in the shape of a tube and forms part of the intake pipe 2. The high-voltage-side electrode 87 is adhered and fixed to the inner circumferential surface of the dielectric 86; the low-voltage-s ide electrode 88 is adhered and fixed to the outer circumferential surface of the dielectric 86. Describing in detail, the dielectric 86 is formed in the shape of a cylindrical tube; flanges to be joined to other respective portions of the intake pipe 2 are provided in the upstream-side end portion and the downstream-side end portion of the dielectric 86. The high-voltage-side electrode 87 has two or more (sixteen, in this example) rod-shaped (square-timber-shaped, in this example) electrode portions 34 that extend in the flowing direction F; the rod-shaped electrode portions 34 are circumferentially arranged in such a way as to be spaced a gap (evenly, in this example) apart from one another. The high-voltage-side electrode 87 has an electrode connection portion (uniillustrated) for connecting the two or more rod-shaped electrode portions 34 and is connected with the driving power source 80. The low-voltage-side electrode 88 is formed in the shape of a cylindrical tube and is disposed at the opposite side of the electrode portions 34 of the high-voltage-side electrode 87, via the dielectric 86.

The protection layer 89 covers the cylindrical tubular region that is the inner circumferential surface of the dielectric 86 and in which the electrode portions 34 of the high-voltage-side electrode 87 are arranged. The inner circumferential surface of the protection layer 89 forms the inner circumferential surface (front side 30) of the electrode plate 82. The protection layer 90 covers the cylindrical tubular region that is the outer circumferential surface of the dielectric 86 and in which the low-voltage-side electrode 88 is disposed. As the dielectric 86, a glass tube, a ceramic tube, a resin tube, a rubber tube, or the like is utilized.

It may be allowed that, a set of heat radiation fins, similar to that in Embodiment 5, are provided on the rear side 31 of the electrode plate 82 included in the outer circumferential surface of the intake pipe 2. It may be allowed that the electrode plate 82, formed in the shape of a tube similar to that in the present Embodiment, is disposed, as Embodiment 1, in the tubular space between the intake pipe 2 and the limiter 85 so that the front side 30 and the rear side 31 of the electrode plate 82 are exposed to the inside of the intake pipe 2.

Embodiment 9

Figure 19:
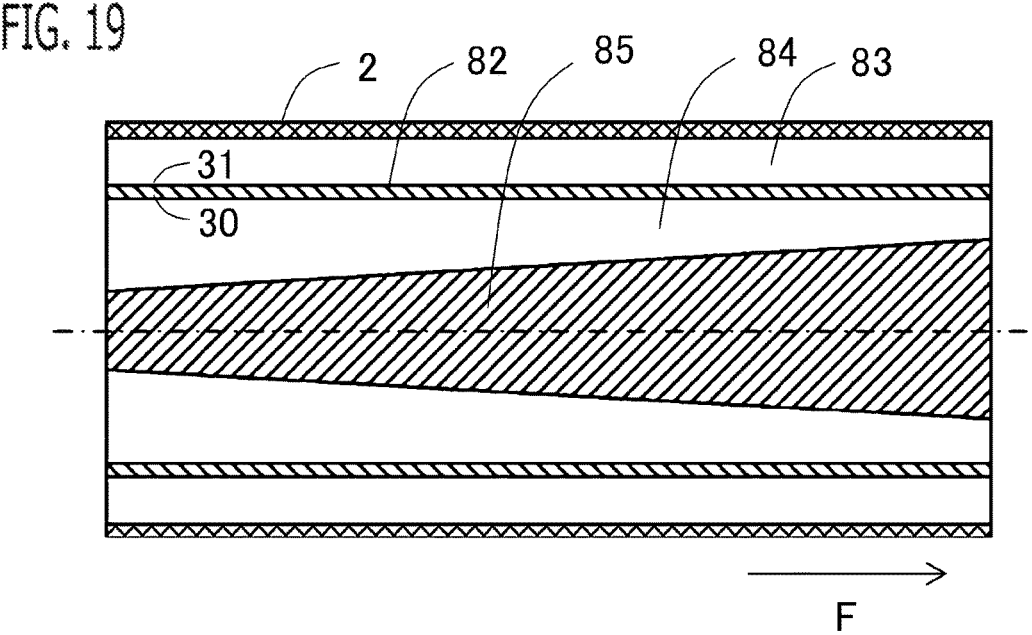
FIG. 19 is a cross-sectional view taken along a plane parallel to the flowing direction, showing an intake pipe, electrode plates, and a limiter according to Embodiment 9 of the present disclosure.
Figure 20:
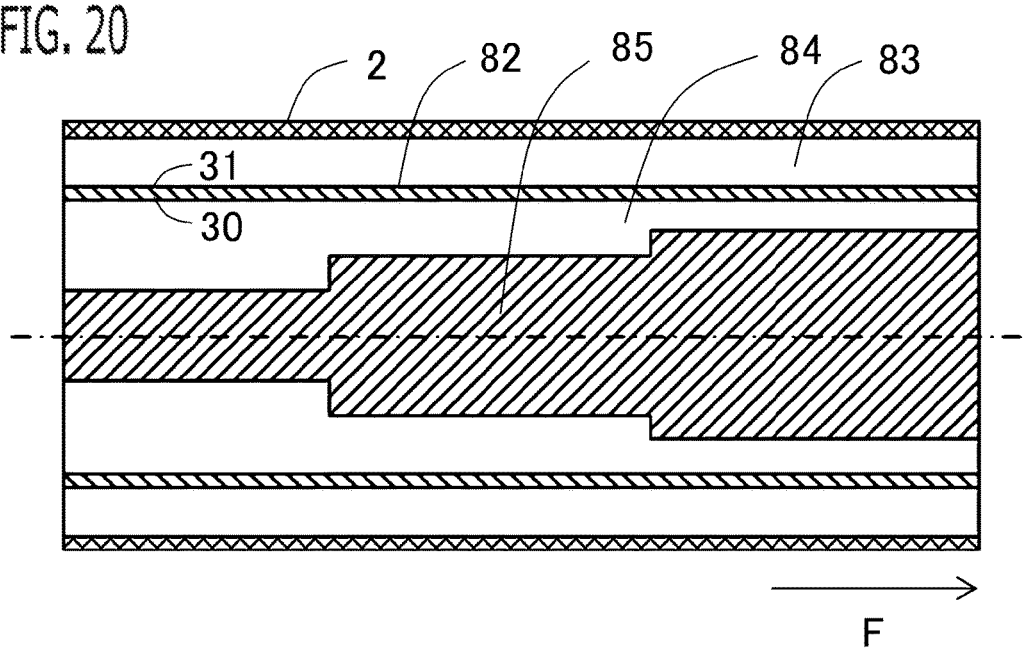
FIG. 20 is a cross-sectional view taken along a plane parallel to the flowing direction, showing the intake pipe, the electrode plates, and the limiter according to Embodiment 9 of the present disclosure.

Next, an internal combustion engine 1 according to Embodiment 9 will be explained. The explanation for constituent parts that are the same as those in Embodiment 1 will be omitted. Each of FIGS. 19 and 20 is a cross-sectional view taken along a plane parallel to the flowing direction F, showing an intake pipe 2, an electrode plate 82, and a limiter 85 according to the present embodiment.

As is the case with Embodiment 1, the limiter 85 is formed in the shape of a column extending in the flowing direction F and is disposed at the central portion of the intake pipe 2. The electrode plate 82 is provided in a direction in which the front side 30 thereof faces the outer circumferential surface of the limiter 85 and in such a way as to surround the circumference of the limiter 85 via a gap.

However, in the present Embodiment, unlike Embodiment 1, the limiter 85 is formed in such a way that the cross-sectional area thereof becomes larger toward the downstream side in the flowing direction F so that the distance from the electrode plate 82 becomes narrower. In the example illustrated in EIG. 19, the limiter 85 is formed in such a way that the cross-sectional area thereof continuously becomes larger toward the downstream side. In the example illustrated in FIG. 20, the limiter 85 is formed in such a way that the cross-sectional area thereof stepwise becomes larger toward the downstream side. The ozone concentration in air becomes larger toward the downstream side and hence the temperature of the air becomes higher; thus, the temperature of the electrode plate 82 readily rises. Reduction of the temperature rise in the electrode plate 82 at the downstream side is effective for raising the ozone generation efficiency. Because the foregoing configuration increases the flow rate of intake air at the downstream side, the cooling effect of the intake air for the electrode plate 82 can be raised. Therefore, it is made possible to suppress the temperature rise in the electrode plate 82 at the downstream side and hence to raise the ozone generation efficiency.

Embodiment 10

Figure 21:
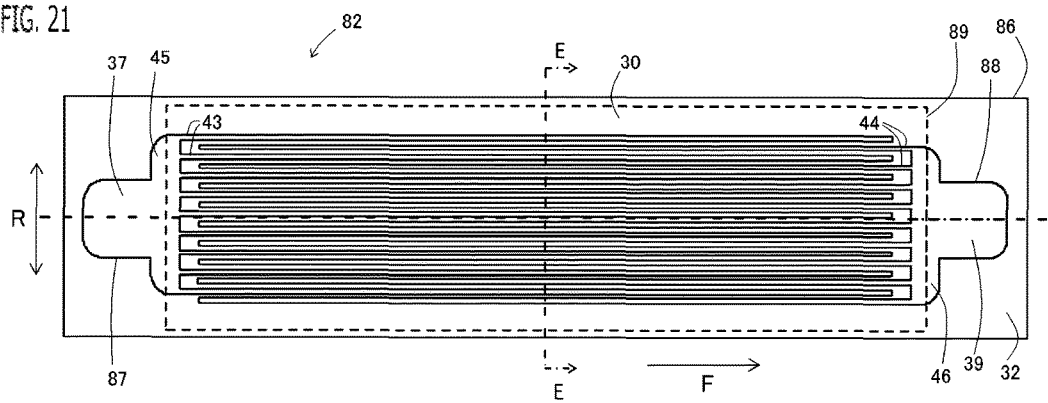
FIG. 21 is a plan view illustrating the front-side structure of an electrode plate according to Embodiment 10 of the present disclosure.
Figure 22:
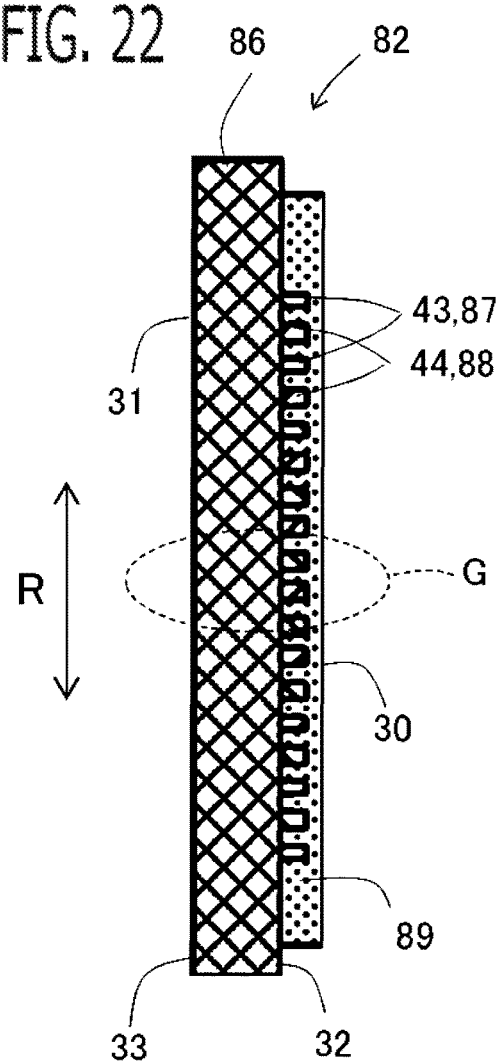
FIG. 22 is a cross-sectional view taken along a plane perpendicular to the flowing direction, showing the electrode plate according to Embodiment 10 of the present disclosure.
Figure 23:
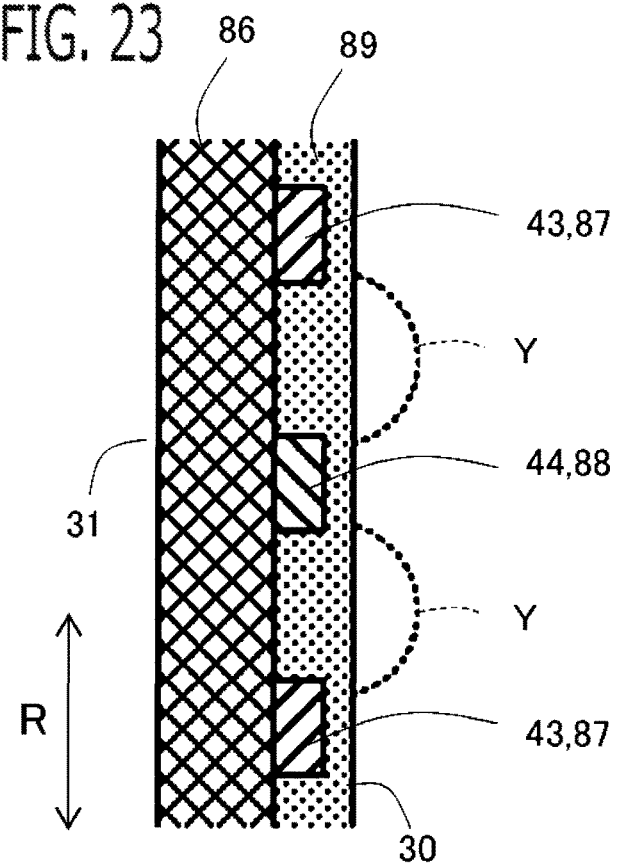
FIG. 23 is an enlarged partial view of FIG. 22.

Next, an internal combustion engine 1 according to Embodiment 10 will be explained. The explanation for constituent parts that are the same as those in Embodiment 1 will be omitted. FIG. 21 is a plan view illustrating the structure, at the front side 30, of the electrode plate 82 according to the present embodiment. In FIG. 21, the protection layers 89 is seen through and is indicated by a broken line. FIG. 22 is a cross-sectional view taken along a plane perpendicular to the flowing direction F at the E-E cross-sectional position in FIG. 21, showing the electrode plate 82. FIG. 23 is an enlarged partial view of the G portion in FIG. 22.

In the present embodiment, unlike Embodiment 1, the high-voltage-side electrode 87 and the low-voltage-side electrode 88 are adhered and fixed to the front side 32 of the dielectric 86. The electrode plate 82 makes ozone produced through surface discharge on the front, side 30 thereof.

The high-voltage-side electrode 87 has two or more rod-shaped electrode portions 43 that are arranged in such a way as to be spaced apart, from one another in a perpendicular direction R, which is perpendicular to the flowing direction F, and extend in the flowing direction F. The low-voltage-side electrode 88 has two or more rod-shaped electrode portions 44 that are arranged in such a way as to be spaced apart from one another in the perpendicular direction R, which is perpendicular to the flowing direction F, and extend in the flowing direction F, Each of the rod-shaped electrode portions 43 of the high-voltage-side electrode 87 and corresponding each of the rod-shaped electrode portions 44 of the low-voltage-side electrode 88 are alternately arranged in such a way as to be spaced apart from each other.

The high-voltage-side electrode 87 has a flat-plate high-voltage-side electrode connecting portion 45 that connects the respective upstream-side end portions of the two or more rod-shaped electrode portions 43 and extends in the perpendicular direction R that is perpendicular to the flowing direction F. The high-voltage-side electrode 87 has a flat-plate high-voltage connecting terminal 37 that extends from the high-voltage-side electrode connecting portion 45 to the upstream side. The high-voltage connecting terminal 37 is connected with the nigh-voltage power source terminal of the driving power source 80 via a connection wire.

The low-voltage-side electrode 88 has a flat-plate low-voltage-side electrode connecting portion 46 that connects the respective downstream-side end portions of the two or more rod-shaped electrode portions 44 and extends in the perpendicular direction R that is perpendicular to the flowing direction F. The low-voltage-side electrode 88 has a flat-plate low-voltage connecting terminal 39 that extends from the low-voltage-side electrode connecting portion 46 to the downstream side. The low-voltage connecting terminal 39 is connected with the low-voltage power source terminal of the driving power source 80 via a connection wire.

The protection layer 89 covers the region in the front side 32 of the dielectric 86 in which the electrode portions 43 of the high-voltage-side electrode 87 and the electrode portions 44 of the low-voltage-side electrode 88 are arranged. Because the electrode portion 43, 44 can be protected by the protection layer 89, it is made possible to prevent ozone from corroding the electrode portions 43, 44 and to prevent the discharge from deteriorating the electrode portion 43, 44. The surface of the protection layer 89 forms the front side 30 of the electrode plate 82. In contrast, because no electrode is provided on the rear side 33 of the dielectric 86, the rear side 33 is not covered with the protection layer. The rear side 33 of the dielectric 86 forms the rear side 31 of the electrode plate 82. Because in the production of the electrode plate 82, the electrodes are formed only on the front side 32 of the dielectric 86, it is made possible to simultaneously form the high-voltage-side electrode 87 and the low-voltage-side electrode 88; thus, it can be expected that simplification of the manufacturing process saves the cost.

As illustrated in FIG. 23, a surface discharge occurs in a region Y, along the front side 30 of the electrode plate 82, that corresponds to the gap between the electrode portion 43 of the high-voltage-side electrode 87 and the electrode portion 44 of the low-voltage-side electrode 88. Because the discharge region can be widened in comparison with the creeping discharge type illustrated in FIG. 7, the discharge area per unit area of the electrode plate 82 can be increased; thus, it is made possible to increase the ozone generation amount or to downsize the electrode plate 82.

The electrode plate 82 having such an electrode structure as that in the present Embodiment may be disposed in such a manner as that in each of the foregoing embodiments 1 through 7 and 9 or may be disposed in such a way as to be formed in the shape of a cylindrical tube, as is the case with Embodiment 8.

Embodiment 11

Figure 24:
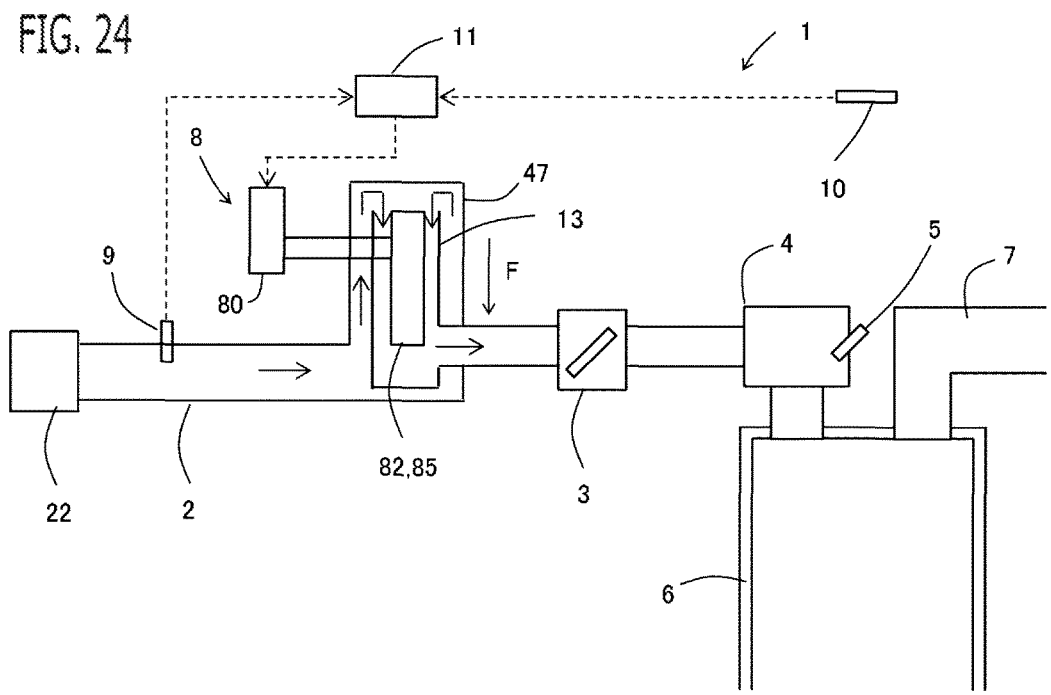
FIG. 24 is a schematic configuration diagram representing the apparatus configuration, the control system, the flow system, and the like of an internal combustion engine according to Embodiment 11 of the present disclosure.

Next, an internal combustion engine 1 according to Embodiment 11 will be explained. The explanation for constituent parts that are the same as those in Embodiment 1 will be omitted, FIG. 24 is a schematic configuration diagram representing the apparatus configuration, the control system, the flow system, and the like of an internal combustion engine 1 according to the present Embodiment. The arrows in FIG. 24 indicate the flowing directions of intake air.

In the present Embodiment, unlike Embodiment 1, the intake pipe 2 has a double-tube-structure portion including a tubular (cylindrical tubular, in this example) outer tube 47 and a tubular (cylindrical tubular, in this example) inner tube 13 disposed inside the outer tube 47 via a gap. The front side 30 of the electrode plate 82 is exposed to the inside of the inner tube 13; the limiter 85 is disposed inside the inner tube 13. The flowing direction F is the flowing direction of air flowing inside the inner tube 13 and is in parallel with the extending direction of the inner tube 13.

The opening, at one side, of the outer tube 47 is connected with the upstream-side single intake pipe 2; the opening, at the other side, of the outer tube 47 is connected with the opening, at the other side, of the inner tube 13; the opening, at the one side, of the inner tube 13 is connected with the downstream-side single intake pipe 2. Intake air that has passed through the air cleaner 22 and then has been taken into the upstream-side intake pipe 2 is introduced from the upstream-side intake pipe 2 into the opening, at the one side, of the outer tube 47 and then flows in the space between the outer tube 47 and the inner tube 13 toward the other side. After that, the intake air is introduced into the opening, at the other side, of the inner tube 13 and then flows in the inner space of the inner tube 13 toward the one side. In this situation, the front, side 30 of the electrode plate 82 ozonizes the intake air. After that, the ozonized intake air is introduced from the opening, at the one side, of the inner tube 13 into the downstream-side intake pipe 2 and then flows through the downstream-side intake pipe 2 toward the cylinder 6.

Because the intake air flowing through the space between the outer tube 47 and the inner tube 13 can cool the outer circumferential surface of the inner tube 13, it is made possible to cool the ozonized intake air flowing inside the inner tube 13 and the electrode plate 82 that makes contact with the intake air. Accordingly, the ozone generation efficiency can be raised.

The electrode plate 82 and the limiter 85 to be arranged in the inner tube 13 may be configured in such a manner as those in each of the foregoing embodiments 1 through 7, 9, and 10 or maybe configured in such a manner as those in the foregoing Embodiment 8. When configured in such a manner as those in Embodiment 8, the rear side 31 of the electrode plate 82 forms the outer circumferential surface of the inner tube 13; therefore, the rear side 31 of the electrode plate 82 can efficiently be cooled by the intake air flowing in the space between the outer tube 47 and the inner tube 13.

Embodiment 12

Next, an internal combustion engine 1 according to Embodiment 12 will be explained. The explanation for constituent parts that are the same as those in Embodiment 1 will be omitted, FIG. 25 is a schematic configuration diagram representing the apparatus configuration, the control system, the flow system, and the like of an internal combustion engine 1 according to the present Embodiment.

In the present embodiment, unlike Embodiment 1, the internal combustion engine 1 is provided with a humidity adjustment unit 15 and a temperature adjustment unit 14 in the intake pipe 2 at the upstream side of the electrode plate 82. The temperature adjustment unit 14 is provided at the upstream side of the humidity adjustment unit 15. The intake air that has passed through the air cleaner 22 and then has been taken into the intake pipe 2 is introduced into the temperature adjustment unit 14; then, the temperature thereof is lowered. The intake air whose temperature has been lowered is introduced into the humidity adjustment unit 15; then, the humidity thereof is lowered. Then, the intake air whose temperature and humidity have been lowered is supplied to the electrode plate 82. It is desirable that in order to raise the ozone generation efficiency, the temperature and the humidity of intake air are lowered. The temperature lowering can reduce thermal decomposition of produced ozone. The humidity lowering can reduce ineffective discharging energy to be dissipated in moisture.

As the temperature adjustment unit 14, there is utilized an air-cooling-type cooling mechanism utilizing a current of cooling air produced by a cooling fan and a current of traveling air produced by travel of a vehicle, a water-cooling-type cooling mechanism utilizing the coolant of the internal combustion engine 1, a cooling mechanism utilizing a thermoelectric transducer such as a Peltier element, or the like. As the humidity adjustment unit 15, there is utilized a dehumidification mechanism or the like that utilizes an absorbent such as silica gel, zeolite, porous alumina, or the like and removes moisture from intake air.

Both the temperature adjustment unit 14 and the humidity adjustment unit 15 are provided; however, it may be allowed that only any one of them is provided. Depending on the temperature-and-humidity environmental condition of the air at the installation place for the internal combustion engine 1, the effect can be obtained even by utilizing only any one of them. It. may be allowed that the element of the air cleaner 22 is formed of silica gel, zeolite, or porous alumina and the humidity adjustment unit 15 is provided in the air cleaner 22. As a result, space-saving can be achieved.

Embodiment 13

Next, an internal combustion engine 1 according to Embodiment. 13 will be explained. The explanation for constituent parts that are the same as those in Embodiment 1 will be omitted. FIG. 26 is a schematic configuration diagram representing the apparatus configuration, the control system, the flow system, and the like of an internal combustion engine 1 according to the present Embodiment.

In the present embodiment, unlike Embodiment 1, the internal combustion engine 1 is provided with a gas separation unit 16 in the intake pipe 2 at the upstream side of the electrode plate 82. The gas separation unit 16 separates intake air into intake air having an increased oxygen concentration and intake air having an increased nitrogen concentration. The gas separation unit 16 is connected in such a way that the intake air having an increased oxygen concentration flows into the intake pipe 2 provided with the electrode plate 82 and that the intake air having an increased nitrogen concentration flows into a bypass pipeline 17 that bypasses the portion of the intake pipe 2, which is provided with the electrode plate 82. The bypass pipeline 17 joins with the intake pipe 2 at the downstream side of the throttle valve 3.

The intake air that has passed through the air cleaner 22 and then has been taken into the intake pipe 2 is introduced into the gas separation unit 16 and then is separated into intake air having an increased oxygen concentration and intake air having an increased nitrogen concentration. Because the electrode plate 82 is supplied with the intake air having an increased oxygen concentration, ozone is produced in a high-efficiency manner and hence the ozone generation amount increases. Because the intake air having an increased oxygen concentration has a decreased nitrogen concentration, the amount of nitrogen oxide produced by the electrode plate 82 decreases. In contrast, the intake air having an increased nitrogen concentration is made to bypass the electrode plate 82 by the bypass pipeline 17 and is introduced into the intake pipe 2 at the downstream side of the electrode plate 82. Accordingly, even when the gas separation unit 16 separates intake air, the amount of intake air to be taken into the cylinder 6 does not change and hence no effect is provided to the intake performance.

Embodiment 14

Figure 27:
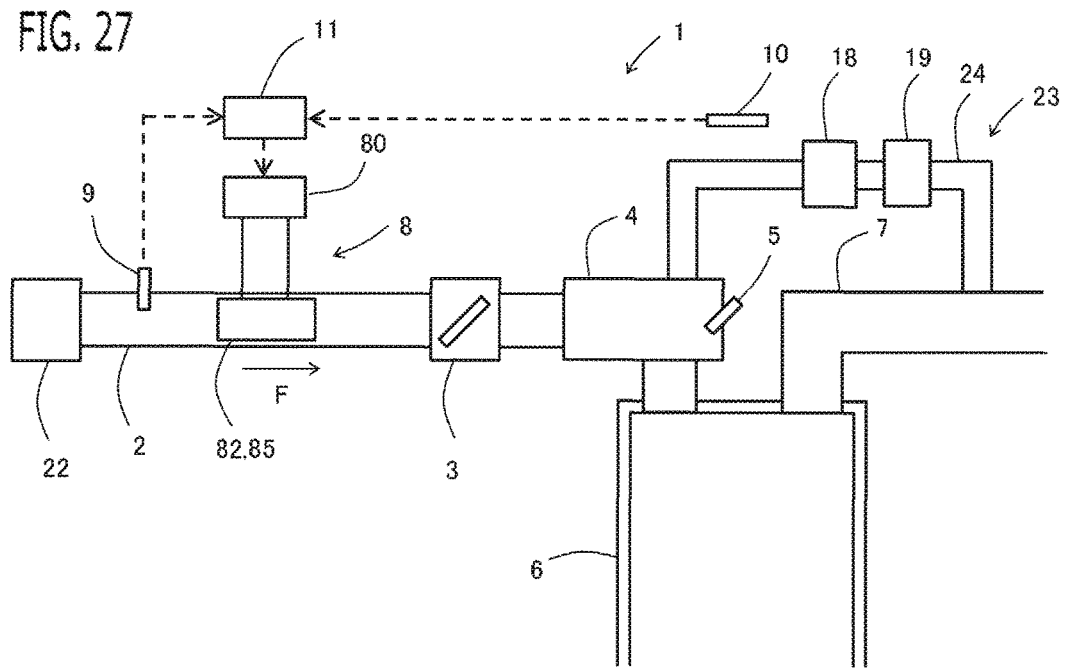
FIG. 27 is a schematic configuration diagram representing the apparatus configuration, the control system, the flow system, and the like of an internal combustion engine according to Embodiment 14 of the present disclosure.

Next, an internal combustion engine 1 according to Embodiment 14 will be explained. The explanation for constituent parts that are the same as those in Embodiment 1 will be omitted. FIG. 27 is a schematic configuration diagram representing the apparatus configuration, the control system, the flow system, and the like of an internal combustion engine 1 according to the present Embodiment.

In the present embodiment, unlike Embodiment 1, the internal combustion engine 1 is provided with an external exhaust gas recirculation system 23 for recirculating exhaust gas to the intake side. There is provided a recirculation path 24 for connecting the exhaust pipe 7 with the intake manifold 4; part of exhaust gas that has been exhausted from the cylinder 6 to the exhaust pipe 7 is recirculated to the intake manifold 4 through the recirculation path 24. A recirculation valve 19 is provided in the recirculation path 24, so that the flow rate of the recirculation gas can be adjusted. Moreover, a recirculation cooler 18 is provided in the recirculation path 24, so that the temperature of the recirculation gas is lowered. Accordingly, the intake air that has been ozonized by the electrode plate 82 is mixed with the recirculated exhaust gas and then is introduced into the cylinder 6.

The respective specific neat values of Carbon dioxide and water included in exhaust gas are larger than that of nitrogen, which is a main component of intake air; thus, the combustion temperature in the cylinder 6 can be lowered by mixing the exhaust gas with the intake air. The reduction of the combustion temperature makes it possible to suppress production of nitrogen oxide caused by the combustion. When exhaust gas is recirculated, the oxygen concentration in the fuel-air mixture to be introduced into the cylinder 6 is lowered. In order to secure the necessary amount of oxygen, the opening degree of the throttle valve 3 is increased and hence the negative pressure in the intake pipe 2 decreases; thus, the reduction of the pumping loss can be expected.

Embodiment 15

Figure 28:
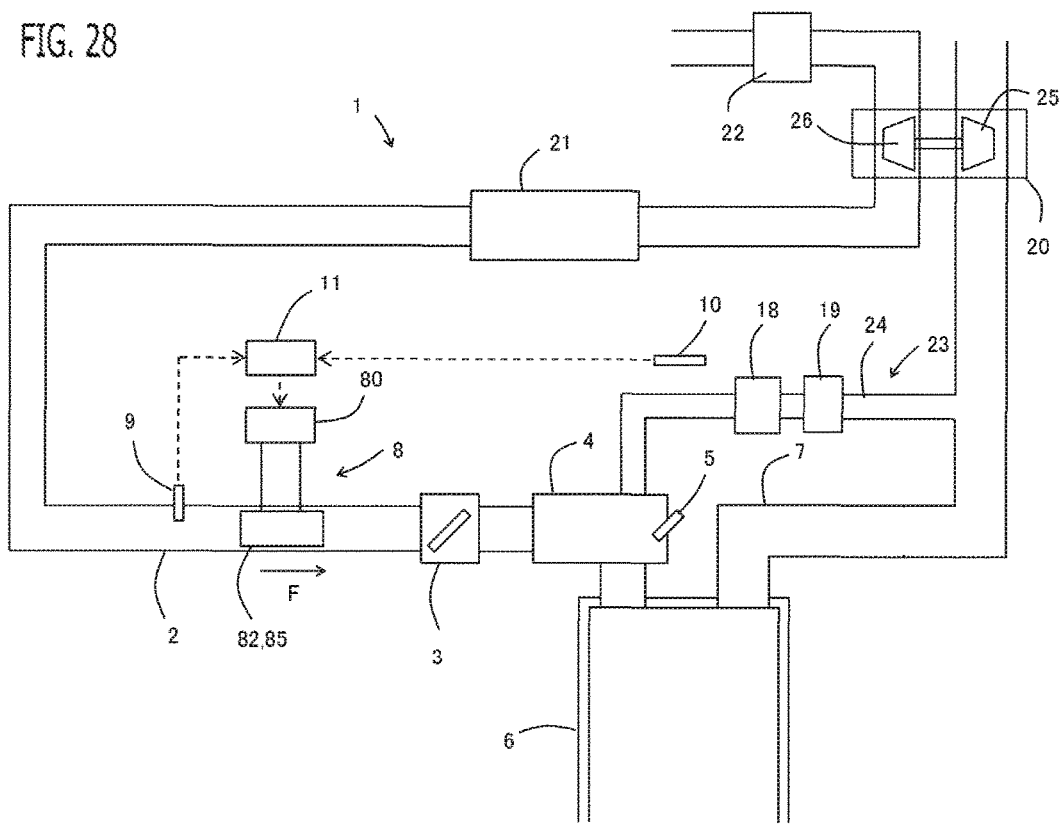
FIG. 28 is a schematic configuration diagram representing the apparatus configuration, the control system, the flow system, and the like of an internal combustion engine according to Embodiment 15 of the present disclosure.

Next, an internal combustion engine 1 according to Embodiment 15 will be explained. The explanation for constituent parts that are the same as those in Embodiment 1 will be omitted. FIG. 28 is a schematic configuration diagram representing the apparatus configuration, the control system, the flow system, and the like of an internal combustion engine i according to the present Embodiment.

In the present embodiment, unlike Embodiment 1, the internal combustion engine 1 is provided with a turbo charger 20. The turbo charger 20 is provided in the exhaust pipe 7 and has a turbine 25 that is driven by exhaust gas and a compressor 26 that is provided in the intake pipe 2 and rotates integrally with the turbine 25. The energy of exhaust gas of the internal combustion engine 1 rotates the turbine 25 and then the compressor 26, so that, intake air is compressed (supercharging). The compressed intake air is cooled by an intercooler 21, so that the density thereof further increases. The electrode plate 82 is provided in the intake pipe 2 between the compressor 26/the intercooler 21 and the throttle valve 3; the electrode plate 82 ozonizes the intake air whose pressure and density nave been raised through the supercharging. Accordingly, the ozone generation amount, of the intake air can be increased.

The internal combustion engine 1 is provided with the exhaust gas recirculation system 23 for recirculating the exhaust gas at the upstream side of the turbine 25 to the intake side. As is the case with foregoing Embodiment 14, the exhaust gas recirculation system 23 is provided with the recirculation path 24, the recirculation valve 19, and the recirculation cooler 18. The exhaust gas recirculation system 23 may be configured in such a way as to recirculate the exhaust gas that has passed through the turbine 25 to the intake side. It may be allowed that instead of the turbo charger, there is provided a mechanical supercharger that drives the compressor provided in the intake pipe by motive power obtained from the output axle of the internal combustion engine 1 through the intermediary of a belt or the like. It may be allowed that a twincharger utilizing both a turbo charger and a mechanical charger is provided.

Embodiment 16

Figure 29:
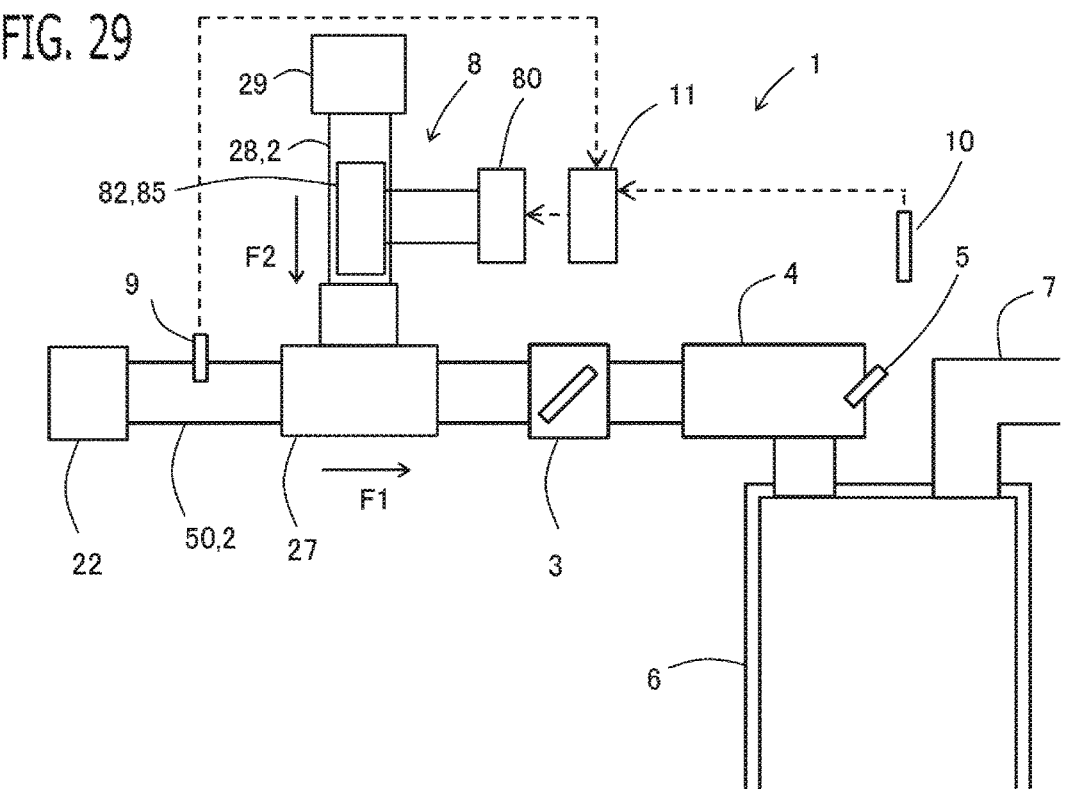
FIG. 29 is a schematic configuration diagram representing the apparatus configuration, the control system, the flow system, and the like of an internal combustion engine according to Embodiment 16 of the present disclosure.
Figure 30:
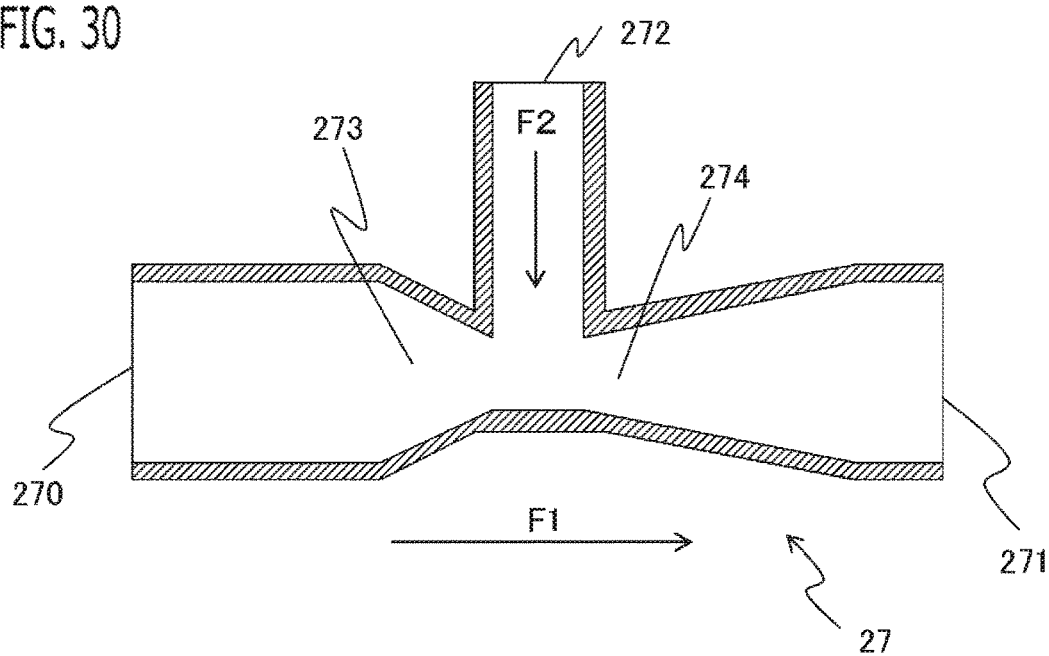
FIG. 30 is a cross-sectional view illustrating the structure of an ejector according to Embodiment 16 of the present disclosure.

Next, an internal combustion engine 1 according to Embodiment 16 will be explained. The explanation for constituent parts that are the same as those in Embodiment 1 will be omitted. FIG. 29 is a schematic configuration diagram representing the apparatus configuration, the control system, the flow system, and the like of an internal combustion engine 1 according to the present Embodiment. FIG. 30 is a cross-sectional view illustrating the structure of an ejector 27 according to the present embodiment.

In the present embodiment, unlike Embodiment 1, the intake pipe 2 has a first intake pipe 50 and a second intake pipe 28 connected with the first intake pipe 50. The ejector 27 is provided in the connection portion between the first intake pipe 50 and the second intake pipe 28. The electrode plate 82 is disposed in the inner region of the second intake pipe 28 or in the second intake pipe 28. The limiter 85 limits the flow of air in the inner region of the second intake pipe 28. The electrode plate 82 is formed in the shape of a plate that extends in a direction F2 (second flowing direction F2) in which air flows in the inner region of the second intake pipe 28.

In the present embodiment, the ejector 27 is provided in the intake pipe 2 between the air cleaner 22 of the first intake pipe 50 and the throttle valve 3. The ejector 27 is provided with an intake air inlet 270 to be connected with the upstream side of the first intake pipe 50, an intake air outlet 271 to be connected with the downstream side of the first intake pipe 50, and a suction opening 272 to be connected with the second intake pipe 28. The ejector 27 is an example of gas sucking and mixing unit that sucks gas flowing in the second intake pipe 28 and mixes it with gas flowing in the first intake pipe 50. In the ejector 27, in accordance with the opening degree of the throttle valve 3, the air that has been introduced into the first intake pipe 50 through the intermediary of the air cleaner 22 in the first intake pipe 50 flows as intake air that travels from the intake air inlet 270 to the cylinder 6 by way of the intake air outlet 271 (a first flowing direction F1); in response to the occurrence of the flow, sucking force is produced in the suction opening 272. The electrode plate 82 ozonises part of the air that is introduced by the sucking force into the second intake pipe 28 through the intermediary of the air cleaner 29 in the second intake pipe 28; after that, the air is sucked by the ejector 27 (the second flowing direction F2) and then is homogenously mixed with the intake air flowing in the intake pipe 2. The ozone generator 8 is controlled in such a way that discharge occurs in synchronization with the timing when the air flows in the second intake pipe 28.

With regard to the ejector 27, when the cylinder 6 performs an intake action, the air is supplied, as intake air to the cylinder 6, to the intake air inlet 270 in accordance with the opening degree of the throttle valve 3, and the flow of fluid to the intake air outlet 271 is formed in the ejector 27. The intake air that has been supplied to the intake air inlet 270 is introduced into a nozzle 273; furthermore, because the flow path cross-sectional area thereof is narrowed in the nozzle 273, the flow rate increases; then, the intake air flows into a diffuser 274. In the diffuser 274, based on Bernoulli's theorem, the pressure falls as the flow rate increases, i.e., a vacuum state is formed and hence the ozonized gas produced by the ozone generator 8 is sucked through the suction opening 272. Inside the ejector 27, mixing of the intake air with the sucked ozonized gas is facilitated; extremely homogenous ozone-containing gas is extracted, as intake air, through the intake air outlet 271 and is supplied to the intake manifold 4.

As described above, the ejector 27 utilizes the sucking force caused by the flow of intake air in the first intake pipe 50, so that it is made possible that the ozonized gas is sucked from the ozone generator 8 in accordance with the opening degree of the throttle valve 3 and is mixed homogenously with the intake air. Furthermore, there is facilitated production of an extremely homogenous premixed gas that is produced by injecting a fuel to the foregoing homogenous mixture fluid. Because ozone is supplied from the second intake pipe 23, the pressure loss in the first intake pipe 50 does not increase; thus, it is made possible to supply a homogenous ozone-containing premixed gas to the cylinder 6, without deteriorating the intake performance of the engine.

[Other Embodiments]

Lastly, other embodiments of the present disclosure will be explained. Each of the configurations of embodiments to be explained below is not limited to be separately utilized but can be utilized in combination with the configurations of other embodiments as long as no discrepancy occurs.

(1) In each of the foregoing embodiments, as an example, there has been explained the case where the internal combustion engine 1 is a port-injection-type HCCI engine. However, embodiments of the present disclosure are not limited to the foregoing case. In other words, the internal combustion engine 1 may be a diesel engine or a gasoline engine; the combustion injection type may be a cylinder injection type.

(2) In each of the foregoing embodiments, as an example, there has been explained the case where the electrode plate 82 is disposed in parallel with the flowing direction F. However, embodiments or tne present disclosure are not limited to the foregoing case. That is to say, it is only necessary that the electrode plate 82 is formed in the shape of a plate that extends in the flowing direction F; the electrode plate 82 may be disposed in such a way as to be inclined with respect to the flowing direction F. It is desirable that even in this case, the electrode plate 82 is inclined in such an extent that the pressure loss does not surpass the allowable value.

(3) In each of the foregoing embodiments, as an example, there has been explained the case where the portion of the intake pipe 2, in which the electrode plate 82 and the limiter 85 are arranged, is formed in the shape of a cylindrical tube. However, embodiments of the present disclosure are not limited to the foregoing case. In other words, it is only necessary that the portion of the intake pipe 2, in which the electrode plate 82 and the limiter 85 are arranged, is formed in the shape of a tube; for example, the portion may be formed in the shape of an elliptic cylinder or a curved cylindrical tube.

(4) In each of the foregoing embodiments, as an example, there has been explained the case where the electrode plate 82 and the limiter 85 are provided in the intake pipe 2 at the upstream side of the throttle valve 3. However, embodiments of the present disclosure are not limited to the foregoing case. That is to say, it may be allowed that the electrode plate 82 an the limiter 85 are provided in the intake pipe 2 (intake manifold 4) at the downstream side of the throttle valve 3.

(5) In each of the foregoing embodiments excluding Embodiment 7, as an example, there has been explained the case where the front side 30 of the electrode plate 82 faces the limiter 85 via a gap. However, embodiments of the present, disclosure are not limited to the foregoing case. In other words, it may be allowed that the front side 30 of the electrode plate 82 does not face the limiter 85, but the rear side 31 of the electrode plate 82 faces the limiter 85 via a gap. For example, in Embodiment 1 and the like, it may be allowed that, the front side 30 and the rear side 31 of the electrode plate 82 are reversely arranged. Specifically, it may be allowed that the electrode plate 82 is provided in a direction in which the rear side 31 thereof faces the outer circumferential surface of the limiter 85 and in such a way as to surround the circumference of the limiter 85 via a gap and the electrode plate 82 is provided in a direction in which the front side 30 thereof faces the inner circumferential surface of the intake pipe 2 and in such a way as to surround the intake pipe 2 via a gap from the inside.

(6) In each of the foregoing embodiments excluding Embodiment 10, as an example, there has been explained the case where the two or more rod-shaped electrode portions 34 included in the high-voltage-side electrode 87 extend in the flowing direction F. However, embodiments of the present disclosure are not limited to the foregoing case. That is to say, it may be allowed that the two or more rod-shaped electrode portions 34 extend in a direction perpendicular to the flowing direction F. In Embodiment 10, as an example, there has been explained the case where the two or more rod-shaped electrode portions 43 included in the high-voltage-side electrode 87 and the two or more rod-shaped electrode portions 44 included in the low-voltage-side electrode 88 extend in the flowing direction F. However, it may be allowed that the two or more rod-shaped electrode portions 43 included in the high-voltage-side electrode 87 and the two or more rod-shaped electrode portions 44 included in the low-voltage-side electrode 88 extend in a direction perpendicular to the flowing direction F.

(7) In each of the foregoing embodiments, as an example, there has been explained the case where the electrode plates 82 are arranged in the shape of a hexagon, a triangle, a quadrangle, a cylindrical tube, or the like that surrounds the limiter 85, when viewed in the flowing direction F. However, embodiments of the present disclosure are not limited to the foregoing case. In other words, it may be allowed that when viewed in the flowing direction F, the electrode plates 82 are arranged in an arbitrary shape, for example, an arbitrary polygon, a C shape, an ellipse, or the like that surrounds the limiter 85.

(8) In each of the foregoing embodiments excluding Embodiment 8, as an example, there has been explained the case where the electrode plate 82 is formed in the shape of a flat plate. However, embodiments of the present disclosure are not limited to the foregoing case. That is to say, it may be allowed that the electrode plate 82 is formed in the shape of a curved plate, similar to that in Embodiment 8. For example, it may be allowed that the electrode plate 82 is formed in the shape of a rectangular plate whose cross section perpendicular to the flowing direction F is curved in an arc-shaped manner and that extends in the flowing direction F.

In the scope of the present disclosure, the embodiments thereof can freely be combined with one another and can appropriately be modified or omitted.

INDUSTRIAL APPLICABILITY

The present disclosure can be applied to an internal combustion engine equipped with an ozone generator for ozonizing intake air.

REFERENCE SIGNS LIST

1: internal combustion engine
2: intake pipe
8: ozone generator
12: heat radiation fin
27: ejector (gas mixing and sucking unit)
28: second intake pipe
30: front side of electrode plate
31: rear side of electrode plate
32: front side of dielectric
33: rear side of dielectric
34: rod-shaped electrode portion of high-voltage-side electrode
38: electrode portion of low-voltage-side electrode
43: rod-shaped electrode portion of high-voltage-side electrode
44: rod-shaped electrode portion of low-voltage-side electrode
50: first intake pipe
82: electrode plate
85: limiter
86: dielectric
87: high-voltage-side electrode
88: low-voltage-side electrode
F: flowing direction
R: perpendicular direction

The invention claimed is:

1. An internal combustion engine with an ozone generator, comprising:
   a tubular intake pipe, through an inner region of which air to be taken into a cylinder flows;
   the ozone generator including an electrode plate that makes ozone produced and is disposed in the inner region or in the intake pipe; and
   a limiter that limits a flow of the air in the inner region,
   wherein the electrode plate has a planar dielectric and high-voltage-side and low-voltage-side electrodes adhered and fixed to the dielectric and formed in a shape of a plate extending in a direction in which the air flows,
   wherein an air inlet and an air outlet of a portion of the intake pipe, in which the electrode plate and the limiter are arranged, face each other, and
   wherein the limiter is a body separate from the tubular intake pipe, disposed in the inner region to be spaced apart by a gap from each of the intake pipe and the electrode plate, and extends in a direction from the air inlet to the air outlet, an end portion thereof facing the air inlet limits the flow of the air.

2. The internal combustion engine with the ozone generator according to claim 1,
   wherein the limiter includes a columnar member formed in a shape of a column extending in the direction from the air inlet to the air outlet and a fixing structure to fix the columnar member to the intake pipe, and
   wherein an end portion, of the columnar member, that faces the air inlet limits the flow of the air.

3. The internal combustion engine with the ozone generator according to claim 2, wherein the columnar member is disposed in the inner region to be spaced apart by a gap from a whole circumference of the intake pipe.

4. The internal combustion engine with the ozone generator according to claim 1,
   wherein the limiter faces the electrode plate via a gap, and
   wherein the high-voltage-side electrode is situated between the dielectric and the limiter.

5. The internal combustion engine with the ozone generator according to claim 1,
   wherein the dielectric is situated between the high-voltage-side electrode and the low-voltage-side electrode, and
   wherein the electrode plate makes ozone produced through creeping discharge on the high-voltage-side electrode.

6. The internal combustion engine with the ozone generator according to claim 5, wherein the high-voltage-side electrode includes two or more rod-shaped electrode portions that are arranged to be spaced apart by a gap from one another in a direction perpendicular to the air flowing direction and extend in the air flowing direction.

7. The internal combustion engine with the ozone generator according to claim 1,
   wherein the dielectric is situated between the high-voltage-side electrode and the low-voltage-side electrode, and
   wherein the electrode plate makes ozone produced through surface discharge on the high-voltage-side electrode.

8. The internal combustion engine with the ozone generator according to claim 7,
   wherein the high-voltage-side electrode includes two or more rod-shaped electrode portions that are arranged to be spaced apart by a gap from one another in a direction perpendicular to the air flowing direction and extend in the air flowing direction,
   wherein the low-voltage-side electrode includes two or more rod-shaped electrode portions that are arranged to be spaced apart by a gap from one another in a direction perpendicular to the air flowing direction and extend in the air flowing direction, and
   wherein each of the two or more electrode portions of the high-voltage-side electrode and corresponding each of the two or more electrode portions of the low-voltage-side electrode are alternately arranged to be spaced apart by a gap from each other.

9. The internal combustion engine with the ozone generator according to claim 1, wherein a side, opposite to the high-voltage-side electrode, of the electrode plate is a non-discharge side.

10. The internal combustion engine with the ozone generator according to claim 1, wherein the air makes contact with a side, opposite to the high-voltage-side electrode, of the electrode plate.

11. The internal combustion engine with the ozone generator according to claim 1,
    wherein the electrode plate is formed in a shape of a tube and forms part of the intake pipe,
    wherein a side, at the high-voltage-side electrode, of the electrode plate forms an inner circumferential surface of the intake pipe and a side opposite to the high-voltage-side electrode forms an outer circumferential surface of the intake pipe, and
    wherein the limiter is formed in a shape of a column extending in the air flowing direction at a radial-direction central portion of the intake pipe.

12. The internal combustion engine with the ozone generator according to claim 11,
wherein the dielectric is formed in a shape of a tube and forms part of the intake pipe, and
wherein the high-voltage-side electrode is adhered and fixed to an inner circumferential surface of the dielectric and the low-voltage-side electrode is adhered and fixed to an outer circumferential surface of the dielectric.

13. The internal combustion engine with the ozone generator according to claim 1,
wherein the limiter is formed in a shape of a column extending in the air flowing direction at a radial-direction central portion of the intake pipe,
wherein the electrode plate is provided to surround a circumference of the limiter via a gap, and
wherein the high-voltage-side electrode is situated between the dielectric and the limiter.

14. The internal combustion engine with the ozone generator according to claim 1, wherein a heat radiation fin is provided at a side, opposite to the high-voltage-side electrode, of the electrode plate.

15. The internal combustion engine with the ozone generator according to claim 1,
comprising a pair of electrode plates, and
wherein a side, opposite to the high-voltage-side electrode, of one of the pair of electrode plates and a side, opposite to the high-voltage-side electrode, of the other one of the pair of electrode plates face each other via a gap.

16. The internal combustion engine with the ozone generator according to claim 1, wherein a cross-sectional area of the limiter becomes larger toward a downstream side in the air flowing direction so that a distance between the electrode plate and the limiter becomes narrower.

17. An internal combustion engine with an ozone generator, comprising:
a tubular intake pipe, through an inner region of which air to be taken into a cylinder flows;
the ozone generator including an electrode plate that makes ozone produced and is disposed in the inner region or in the intake pipe; and
a limiter that limits a flow of the air in the inner region,
wherein the electrode plate includes a planar dielectric and high-voltage-side and low-voltage-side electrodes adhered and fixed to the dielectric and is formed in a shape of a plate extending in a direction in which the air flows,
wherein the limiter is a body separate from the tubular intake pipe and is disposed in the inner region to be spaced apart by a gap from each of the intake pipe and the electrode plate,
wherein the intake pipe has a first intake pipe and a second intake pipe connected with the first intake pipe,
wherein a gas mixing and sucking structure is provided in a connection portion between the first intake pipe and the second intake pipe,
wherein the electrode plate is disposed in an inner region of the second intake pipe or in the second intake pipe, and
wherein the limiter limits the flow of the air in the inner region of the second intake pipe.

* * * * *